United States Patent
Galit et al.

(10) Patent No.: US 8,175,972 B2
(45) Date of Patent: May 8, 2012

(54) PRE-PAID CARD TRANSACTION COMPUTER TO LOAD A LOAN ON A PRE-PAID CARD

(75) Inventors: Scott H. Galit, New York, NY (US); Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 140 days.

(21) Appl. No.: 12/465,803

(22) Filed: May 14, 2009

(65) Prior Publication Data

US 2009/0287605 A1  Nov. 19, 2009

Related U.S. Application Data

(60) Provisional application No. 61/053,056, filed on May 14, 2008.

(51) Int. Cl.
 *G06Q 40/00* (2012.01)
(52) U.S. Cl. .............. 705/41; 705/39; 705/44; 705/35
(58) Field of Classification Search ............... 705/35–41
 See application file for complete search history.

(56) References Cited

U.S. PATENT DOCUMENTS

| | | |
|---|---|---|
| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |

(Continued)

FOREIGN PATENT DOCUMENTS

EP  0348932  1/1990

(Continued)

OTHER PUBLICATIONS

Q Comm Expands Calling Card Products with Best Telecom Point-of-Sale Activated Cards; All Q Comm VeriFone Merchants Can Now Deliver Durable Calling Cards. (Dec. 6). Business Wire, 1. Retrieved Dec. 9, 2011, from Business Dateline. (Document ID: 937714311).*

(Continued)

*Primary Examiner* — Alexander Kalinowski
*Assistant Examiner* — Abhishek Vyas
(74) *Attorney, Agent, or Firm* — Bracewell & Giuliani LLP

(57) ABSTRACT

A loan transaction for a pre-paid card is approved for a borrower so that release of the loan proceeds is pending an activation of a pre-paid card. A pre-paid card transaction computer activates a pre-paid card responsive to an activation request on behalf of the borrower. The pre-paid card transaction computer indicates the activated pre-paid card is to be used with a loan transaction pending the activation of the pre-paid card. The pre-paid card transaction computer loads the pending loan proceeds to the pre-paid card so that the loan proceeds are released to the approved borrower and are immediately available to thereby convert the pre-paid card into a loan delivery apparatus.

20 Claims, 14 Drawing Sheets

U.S. PATENT DOCUMENTS

| | | | |
|---|---|---|---|
| 4,722,054 A | 1/1988 | Yorozu et al. | |
| 4,727,243 A | 2/1988 | Saver | |
| 4,750,201 A | 6/1988 | Hodgson et al. | |
| 4,797,540 A | 1/1989 | Kimizu | |
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanäräet al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,121 A | 11/1996 | Davis et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,933,812 A | 8/1999 | Meyer et al. | |
| 5,963,921 A | 10/1999 | Longfield | |
| 6,000,608 A | 12/1999 | Dorf | |
| 6,012,635 A | 1/2000 | Shimada et al. | |
| 6,021,397 A * | 2/2000 | Jones et al. | 705/36 R |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziamo | |
| 6,304,860 B1 | 10/2001 | Martin et al. | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 * | 3/2006 | Anderson et al. | 705/31 |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson | |
| 7,206,761 B2 | 4/2007 | Colvin | |
| 7,258,273 B2 | 8/2007 | Griffin | |
| 7,398,919 B2 | 7/2008 | Cooper | |
| 7,426,492 B1 | 9/2008 | Bishop et al. | |
| 7,451,920 B1 * | 11/2008 | Rose | 235/380 |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,606,918 B2 | 10/2009 | Holzman et al. | |
| 7,607,570 B1 | 10/2009 | Constantine | |
| 7,628,319 B2 | 12/2009 | Brown et al. | |
| 7,653,591 B1 | 1/2010 | Dabney | |
| 7,702,583 B1 | 4/2010 | Hamilton et al. | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 | 10/2010 | Johnson | |
| 7,865,434 B2 | 1/2011 | Sheets | |
| 7,904,333 B1 | 3/2011 | Perkowski | |
| 7,933,833 B2 | 4/2011 | Hotz et al. | |
| 7,954,704 B1 | 6/2011 | Gephart et al. | |
| 8,046,256 B2 | 10/2011 | Chien et al. | |
| 8,051,006 B1 | 11/2011 | Rourk | |
| 2001/0021925 A1 | 9/2001 | Ukigawa et al. | |
| 2001/0034676 A1 | 10/2001 | Vasic | |
| 2001/0042785 A1 * | 11/2001 | Walker et al. | 235/379 |
| 2002/0002075 A1 | 1/2002 | Rowe | |
| 2002/0032612 A1 | 3/2002 | Williams et al. | |
| 2002/0038285 A1 | 3/2002 | Golden et al. | |
| 2002/0055909 A1 | 5/2002 | Fung et al. | |
| 2002/0077971 A1 | 6/2002 | Allred | |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0055782 A1 | 3/2003 | Slater | |
| 2003/0061170 A1 | 3/2003 | Uzo | |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 | 9/2003 | Adams | |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 | 10/2003 | Lee et al. | |
| 2003/0208443 A1 | 11/2003 | Mersky | |
| 2003/0217003 A1 | 11/2003 | Weinflash et al. | |
| 2004/0036215 A1 | 2/2004 | Butler, II | |
| 2004/0098351 A1 | 5/2004 | Duke | |
| 2004/0111370 A1 | 6/2004 | Saylors et al. | |
| 2004/0117250 A1 | 6/2004 | Lubow et al. | |
| 2004/0117302 A1 * | 6/2004 | Weichert et al. | 705/40 |
| 2004/0133515 A1 | 7/2004 | McCoy et al. | |
| 2004/0143527 A1 | 7/2004 | Benkert et al. | |
| 2004/0148252 A1 | 7/2004 | Fleishman | |
| 2004/0153407 A1 | 8/2004 | Clubb et al. | |
| 2004/0215554 A1 | 10/2004 | Kemper et al. | |
| 2004/0225545 A1 | 11/2004 | Turner et al. | |
| 2004/0230523 A1 | 11/2004 | Johnson | |
| 2004/0236646 A1 | 11/2004 | Wu et al. | |
| 2005/0004839 A1 | 1/2005 | Bakker et al. | |
| 2005/0015332 A1 | 1/2005 | Chen | |
| 2005/0021363 A1 | 1/2005 | Stimson et al. | |
| 2005/0075939 A1 | 4/2005 | Bao et al. | |
| 2005/0082364 A1 | 4/2005 | Alvarez et al. | |
| 2005/0108121 A1 | 5/2005 | Gravett et al. | |
| 2005/0167481 A1 | 8/2005 | Hansen et al. | |
| 2005/0173520 A1 | 8/2005 | Jaros et al. | |

| | | |
|---|---|---|
| 2005/0203837 A1 | 9/2005 | Leigh et al. |
| 2005/0205663 A1 | 9/2005 | Allgiene |
| 2005/0228724 A1 | 10/2005 | Frangiosa |
| 2005/0278347 A1 | 12/2005 | Wolf et al. |
| 2005/0283436 A1 | 12/2005 | Greer et al. |
| 2006/0059085 A1 | 3/2006 | Tucker |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175984 A1 | 8/2007 | Khandaker et al. |
| 2007/0198352 A1 | 8/2007 | Kannegiesser |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0282740 A1 | 12/2007 | Wendt |
| 2008/0005001 A1 | 1/2008 | Davis et al. |
| 2008/0040261 A1 | 2/2008 | Nix et al. |
| 2008/0040265 A1 | 2/2008 | Rackley et al. |
| 2008/0052189 A1 | 2/2008 | Walker et al. |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0228643 A1 | 9/2008 | Hall |
| 2008/0281734 A1 | 11/2008 | Longe et al. |
| 2008/0301162 A1 | 12/2008 | Wall et al. |
| 2009/0048963 A1 | 2/2009 | Bishop et al. |
| 2009/0063342 A1 | 3/2009 | Beckers |
| 2009/0157220 A1 | 6/2009 | Walker et al. |
| 2009/0164362 A1* | 6/2009 | Moore ............ 705/38 |
| 2009/0164363 A1 | 6/2009 | Ahlers |
| 2009/0192934 A1 | 7/2009 | Chu et al. |
| 2009/0222367 A1* | 9/2009 | Jenkins et al. ......... 705/35 |
| 2009/0228307 A1* | 9/2009 | Sorbe ................ 705/4 |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1* | 3/2010 | Sibson ............ 705/38 |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1 | 12/2010 | Johnson |
| 2010/0312684 A1 | 12/2010 | Kemper et al. |

FOREIGN PATENT DOCUMENTS

| | | |
|---|---|---|
| EP | 0397512 | 11/1990 |
| EP | 0397512 A2 | 11/1990 |
| EP | 0619565 | 10/1994 |
| EP | 0619565 A1 | 10/1994 |
| EP | 0348932 A2 | 5/1995 |
| JP | 2-238593 | 9/1990 |
| JP | 2-238593 A | 9/1990 |
| JP | 2-278495 | 11/1990 |
| JP | 2-278495 A | 11/1990 |
| JP | 3-100791 | 4/1991 |
| JP | 3-100791 A | 4/1991 |
| JP | 4-165588 | 6/1992 |
| JP | 4-165588 A | 6/1992 |
| KR | 2010010217 | 2/2010 |
| WO | WO 86/02757 A1 | 5/1986 |
| WO | WO8602757 | 5/1986 |
| WO | WO 86/07647 A1 | 12/1986 |
| WO | WO8607647 | 12/1986 |
| WO | WO 88/03297 A1 | 5/1988 |
| WO | WO8803297 | 5/1988 |
| WO | WO 89/08899 A1 | 9/1989 |
| WO | WO8908899 | 9/1989 |
| WO | WO 91/09370 A1 | 6/1991 |
| WO | WO9109370 | 6/1991 |
| WO | WO 93/09515 A1 | 5/1993 |
| WO | WO9309515 | 5/1993 |
| WO | WO 94/10649 A1 | 5/1994 |
| WO | WO9410649 | 5/1994 |
| WO | WO 94/28498 A1 | 12/1994 |
| WO | WO9428498 | 12/1994 |
| WO | WO 95/03570 A2 | 2/1995 |
| WO | WO9503570 | 2/1995 |
| WO | WO 97/46986 A1 | 12/1997 |
| WO | WO9746986 | 12/1997 |
| WO | WO0060487 | 10/2000 |
| WO | WO2007133315 A2 | 11/2007 |
| WO | 2008102329 A2 | 8/2008 |
| ZA | 200709282 | 10/2007 |

OTHER PUBLICATIONS

MasterCard Electronic prepaid. (Oct. 2003). The Nilson Report, (798), 1, 4+. Retrieved Dec. 9, 2011, from Banking Information Source. (Document ID: 474833171).*

Office Action dated Mar. 4, 2011, in co-pending U.S. Appl. No. 12/338,684.

Office Action dated Mar. 17, 2011, in co-pending U.S. Appl. No. 12/417,199.

Office Action dated Mar. 22, 2011, in co-pending U.S. Appl. No. 12/338,584.

Office Action dated Mar. 29, 2011, in co-pending U.S. Appl. No. 12/417,211.

Office Action dated Mar. 29, 2011, in co-pending U.S. Appl. No. 12/407,320.

Office action from co-pending U.S. Appl. No. 12/338,497 dated Aug. 18, 2011.

Notice of Allowance of co-pending U.S. Appl. No. 12/417,199 dated Aug. 18, 2011.

Notice of Allowance of co-pending U.S. Appl. No. 12/417,211 dated Aug. 22, 2011.

Wolfe, Daniel, "An E-Variation on Payday Loan Theme", American Banker, Jul. 28, 2005 (cited in Notice of Allowance by Examiner).

"Letter of Credit. Explained: What is Letter of Credit?", Dec. 26, 2005, pp. 1-2 (cited in Office Action from co-pending U.S. Appl. No. 12/338,540 dated Sep. 1, 2011).

Office Action from co-pending U.S. Appl. No. 12/338,540 dated Sep. 1, 2011.

Notice of Allowance of co-pending U.S. Appl. No. 12/338,365 dated Sep. 1, 2011.

Co-pending U.S. Appl. No. 13/036,076, filed Feb. 28, 2011, titled Machine, Program Product, and Computer Implemented Method to Construct a Person-To-Person Loan.

Office Action dated Feb. 18, 2011, in co-pending U.S. Appl. No. 12/338,402.

Office Action in co-pending U.S. Appl. No. 12/609,896 dated Apr. 5, 2011.
Office Action in co-pending U.S. Appl. No. 12/417,162 dated Apr. 13, 2011.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking (as cited on Notice of Allowance in co-pending U.S. Appl. No. 12/554,659 by Examiner).
Financial Advice Investment Money Oct. 1, 2009 at 7:25am, HSBC Offshore Internet Banking (as cited on Notice of Allowance in co-pending U.S. Appl. No. 12/554,659 by Examiner).
Office Action from co-pending U.S. Appl. No. 12/626,349, dated Nov. 22, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (cited in Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
International Search Report dated May 27, 2009 for PCT/US2009/039504 filed Apr. 3, 2009.
International Search Report dated Jun. 8, 2009 for PCT/US2009/039512 filed Apr. 3, 2009.
International Search Report dated Jun. 30, 2009 for PCT/US2009/043978 filed May 14, 2009.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/389,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.
Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
Microtrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day In and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.

Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
Office Action dated Jul. 9, 2010 for U.S. Appl. No. 12/338,365.
Office Action dated Jul. 9, 2010 for U.S. Appl. No. 12/338,645.
Co-pending U.S. Appl. No. 12/554,659, filed Sep. 4, 2009, titled "System, Method and Program Product for Foreign Currency Travel Account".
Co-pending U.S. Appl. No. 12/554,432, filed Sep. 4, 2009, titled "System, Program Product and Methods for Retail Activation and Reload Associated with Partial Authorization Transactions".
Cross, Sam Y., All About . . . the Foreign Exchange Market in the United States, 1998, Federal Reserve Bank of New York.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Jane Boon Pearlstine, Lenders, Borrowers Hook Up Over The Web: Prosper.com and Other Sites Provide Forum for Individual Bidders Willing to Offer Small Loans, Wall Street Journal, May 20, 2006.
United Nations Conference on Trade and Development, E-finance and Small and Medium-Size Enterprises (SMEs) in Developing and Transition Economies, UNCTAD Expert Meeting, Oct. 17, 2001.
Tim Jones. Paradigms loast, RSA Journal, Oct. 2006, pp. 28-31.
Diego Rumiany, Internet Bidding for Microcredit: making it work in the developed world, conceiving it for the developing world, Mar. 2007.
Stefan Heng, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K, Hulme and Colette Wright, Internet Based Social Lending: Past, Present and Future, Social Futures Observatory, Oct. 2006.
Richard W. Coleman, Is the Future of the Microfinance Movement to be Found on the Internet?, International Trade and Finance Association Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-Pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 16, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,306, filed May 13, 2009, titled "System, Program Product, and Computer-Implemented Method for Loading a Loan on an Existing Pre-Paid Card".
Co-pending Appl. No. 12/465,277, filed May 13, 2009, titled "System, Program Product, and Computer-Implemented Method for Loading a Loan on a Pre-Paid Card".
International Search Report from co-pending PCT Application No. PCT/US2009/034692 dated Apr. 14, 2009.
International Search Report from co-pending PCT Application No. PCT/US2009/039495 dated May 18, 2009.
International Search Report from co-pending PCT Application No. PCT/US2008/087689 dated Jun. 17, 2009.
International Search Report from co-pending PCT Application No. PCT/US2009/039492 dated May 14, 2009.
International Search Report from co-pending PCT Application No. PCT/US2009/043988 dated Jul. 14, 2009.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Co-pending U.S. Appl. No. 12/607,780, filed Oct. 28, 2009, titled Shopping Center Gift Card Offer Fulfillment Machine, Program Product, and Associated Methods.
Co-pending U.S. Appl. No. 12/609,896, filed Oct. 30, 2009, titled Machine Methods, and Program Product for Electronic Order Entry.
Co-pending U.S. Appl. No. 12/626,349, filed Nov. 25, 2009, titled Machine, Methods, and Program Product for Electronic Inventory Tracking.

International Search Report for PCT/US09/56072 dated Oct. 20, 2009.

Bank Deals—Best Rates and Deals: EverBank's World Currency CDs—My Interview with Everbank's Executive Frank Trotter, http://bankdeals.com, Jul. 29, 2007.

VIPGift Receives Investment From Summit Partners and Bridgescale Partners, Nov. 11, 2008, Chattanooga, TN and Palo Alto, CA.

VeriFone TCL Terminal Control Language Programmer's Manual, VeriFone Part No. 00368-01, Revision G, Manual Revision 8.0, Aug. 1992, 362 pages.

VeriFone Tranz 330 Reference Manual, Verifone Part No. 00483—Revision D, Manual Revision 3.01, Apr. 1990, 144 pages.

MicroTrax Ltd. Omni 490M (and 490ML) Operation Manual for Integrated and Non-Integrated Configurations, 1994, 60 pages.

MicroTrax Electronic Payment Systems: The MicroTrax Pinstripe Lane Equipment Users Guide, MicroTrax Ltd., Newport Beach, CA 1991, 54 pages.

IBM 4680-4690 Supermarket Application—Electronic Funds Transfer Feature Enhancement: User's Guide, IBM Corp., Research Triangle Park, NC, Sep. 1995, 318 pages.

IBM 4680 General Sales Application Electronic Funds Transfer User's Guide, IBM Corp., Research Triangle Park, NC, Dec. 1990, 260 pages.

IBM 4680 General Sales Application Electronic Funds Transfer User's Guide, IBM Corp., Research Triangle Park, NC, Mar. 1991, 263 pages.

IBM 4680 General Sales Application: Guide to Operations, Research Triangle Park, NC, Jun. 1991, 429 pages.

Congressional Budget Office, "Emerging Electronic Methods for Making Payments" (Jun. 1996), CBO.

Coady et al., "Targeted anti-poverty intervention: A selected annotated bibliography" (Apr. 2002), World Bank.

Notice of Allowance from co-pending U.S. Appl. No. 12/609,896 dated Jan. 3, 2012.

Notice of Allowance from co-pending U.S. Appl. No. 13/233,268 dated Dec. 13, 2011.

Office Action from co-pending U.S. Appl. No. 12/367,187 dated Jan. 6, 2012.

Office Action from co-pending U.S. Appl. No. 12/731,852 dated Dec. 22, 2011.

Downes, How to avoid exchange charges WASTING MONEY A foreign currency bank account could be the answer, The Daily Telegraph, London (UK), Mar. 10, 2007.

Office Action for co-pending U.S. Appl. No. 13/232,405 dated Feb. 2, 2012.

Office Action for co-pending U.S. Appl. No. 12/877,524 dated Feb. 14, 2012.

Notice of Allowance for co-pending U.S. Appl. No. 12/417,182 dated Feb. 14, 2012.

Final Office Action for co-pending U.S. Appl. No. 12/338,497 dated Mar. 1, 2012.

Final Office Action for co-pending U.S. Appl. No. 12/465,277 dated Feb. 28, 2012.

* cited by examiner

METHOD AVAILABILITY BY PROCESSOR

| Method Name | Processor1 | Processor2 | Processor3 | Processor4 | Processor5 |
|---|---|---|---|---|---|
| ActivateAccount | | | X | | |
| ActivateCard | X | X | X | X | X |
| AddCard | | X | X | | |
| CloseCard | X | X | X | X | X |
| CreateCard | | X | | | X |
| GetAccountId | | | X | | X |
| GetBulkOrder | | | X | | |
| GetCardBalance | X | X | X | X | X |
| GetCardholder | X | X | X | X | X |
| GetCardholderAndBalance | X | X | X | X | X |
| GetCardId | | | | | X |
| GetTransactionHistory | X | X | X | X | X |
| LostStolen | X | X | | X | X |
| Ping | X | X | | | X |
| PostFee | X | X | X | X | X |
| PostLoad | X | X | X | X | X |
| ProcessNegativeBalance | X | X | | X | X |
| RegisterCardholder | X | X | X | X | |
| SetExpirationDate | | X | | X | |
| UpdateCardholder | X | X | X | X | |

FIGURE 14

PRE-PAID CARD TRANSACTION COMPUTER TO LOAD A LOAN ON A PRE-PAID CARD

RELATED APPLICATIONS

This application claims priority to and the benefit of: U.S. Provisional Patent Application Ser. No. 61/053,056, by Galit et al., titled "System, Program Product, and Method for Loading a Loan on a Pre-Paid Card" filed May 14, 2008, which is incorporated herein by reference in its entirety. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods to Authorize Draw for Micro-Credit Attached to a Prepaid Card" filed on Apr. 4, 2008; U.S. Provisional Patent Application Ser. No. 61/042,624, by Crowe et al., titled "System, Program Product, and Method to Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid Cards, Associated Systems and Computer Program Products" filed on Feb. 20, 2009; U.S. patent application Ser. No. 12/417,199, by Ahlers et al., titled "System, Program Product, and Associated Methods to Authorize Draw for Micro-Credit Attached to a Prepaid Card" filed on Apr. 2, 2009; U.S. patent application Ser. No. 12/417,211, by Ahlers et al., titled "System, Program Product, and Associated Methods to Authorize Draw for Micro-Credit Attached to a Prepaid Card" filed on Apr. 2, 2009; PCT/US09/39492, by Ahlers et al., titled "System, Program Product, and Associated Methods to Authorize Draw for Micro-Credit Attached to a Prepaid Card" filed on Apr. 3, 2009; PCT/US09/39504, by Ahlers et al., titled "System, Program Product, and Associated Methods to Authorize Draw for Micro-Credit Attached to a Prepaid Card" filed on Apr. 3, 2009; U.S. patent application Ser. No. 12/417,182, by Crowe et al., titled "System, Program Product, and Method to Authorize Draw for Retailer Optimization" filed on Apr. 2, 2009; PCT/US09/39512, by Crowe et al., titled "System, Program Product, and Method to Authorize Draw for Retailer Optimization" filed on Apr. 3, 2009; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; PCT/US08/87689 by Galit et al., titled "Computer-Implemented Methods, Program Product, and System to Enhance Banking Terms Over Time" filed on Dec. 19, 2008; U.S. patent application Ser. No. 12/417,162, by Ahlers et al., titled "System, Program Product, and Method For Debit Card and Checking Account Autodraw" filed on Apr. 3, 2009; PCT/US09/39495, by Ahlers et al., titled "System, Program Product, and Method For Debit Card and Checking Account Autodraw" filed on Apr. 3, 2009; U.S. patent application Ser. No. 12/465,277, by Galit et al., titled "System, Program Product, and Computer-Implemented Method for Loading a Loan on a Pre-Paid Card" filed on May 13, 2009; and U.S. patent application Ser. No. 12/465,306, by Galit et al., titled "System, Program Product, and Computer-Implemented Method for Loading a Loan on an Existing Pre-Paid Card" filed on May 13, 2009, all of which are each incorporated herein by reference in their entireties.

BACKGROUND

1. Field of Invention

The present invention relates generally to the financial service and banking product industries, and, more particularly, to systems, computer program products, and associated methods of providing loan proceeds to a pre-paid card.

2. Background

It is recognized that non-traditional short-term lending, including, e.g., payday loans, payday advances, and other short-term cash advances, is an over $20 billion per year industry. Non-traditional loans, however, involve delays and hassles associated with applying for and obtaining the loan prior to the consumer having access to the funds.

In a retail environment, such as a bank branch or a payday loan store, consumers must travel to their location of choice, apply for the loan, and then wait for a decision from the lender. In some cases, the decision is immediate and the consumer is able to leave the retail lender with funds in hand—usually in the form of a negotiable instrument, e.g., a check. In other cases, the decision requires enough time to elapse that the funding takes place on a later date, which may require the consumer to make a second trip to the retail lender to receive proceeds. Both scenarios are inconvenient and costly to the consumer given the time commitment, travel costs (i.e., gas), and the costs of cashing the instrument used to fund the loan. The system is particularly inefficient for return customers whose credit record is already known and who are essentially pre-approved for future borrowing based on past performance. These customers find themselves traveling to the retail lender primarily just to pick up a loan check. The customer typically cashes the check at another location and only then uses the proceeds.

While less common today with the explosion of Internet-based lending, applying for credit by mail or by telephone is still the most popular means by which consumers obtain credit cards. Here, the consumer forwards application information to the lender. Once received, the lender underwrites and makes the credit decision. If approved, the lender must order a credit card with the consumers personalized information (name and account number on the card). This process can take two to six weeks in most cases, and as a result, is inconvenient at best and useless at worst, especially for consumers in need of loan funds immediately.

Online payday lending, peer-to-peer (also known as person-to-person or P2P) lending, and even traditional bank lending has grown rapidly in the last 8 to 10 years. The typical model involves a consumer submitting various pieces of personal information via a secure website that the lender will use to grant credit. In most cases, the decision to grant credit is immediate (with the exception of P2P auction-style borrowing). The funding of the loan, however, is still delayed. In some cases, the consumer can have loan proceeds deposited into a bank account via the Automated Clearing House (ACH). As understood by those skilled in the art, Automated Clearing House (ACH) is the name of an electronic network for financial transactions in the United States, regulated by the Federal Reserve. Alternately, the funds are delivered to the customer through the mail, usually in the form of a negotiable instrument, such as a check. For those applying for credit cards, they must still wait to access the line of credit until their card arrives 2 to 6 weeks later.

It is known that access to proceeds from a negotiable instrument, such as a check, can be delayed for processing, i.e., waiting for the check to clear, particularly when the proceeds check is drawn on a non-local bank. In addition, such access can generate fees, e.g., a check-cashing fee.

SUMMARY OF INVENTION

In view of the foregoing, Applicants have recognized one or more sources of many of these problems and provides enhanced embodiments of methods, e.g., computerized methods, of loading loan proceeds to a pre-paid card, and associated systems and computer program products. According to an embodiment of the present invention, a bank receives authorization from a lender to credit loan proceeds from the lender to an approved borrower on a pre-paid card issued by or associated with a pre-paid card processor so that release of the loan proceeds is pending an activation of a pre-paid card. Next, the bank receives notice of an activation of a pre-paid card issued by or associated with the pre-paid card processor responsive to an activation request on behalf of the approved borrower. Then the bank credits the pending loan proceeds to the pre-paid card processor for the activated pre-paid card so that the loan proceeds are released to the approved borrower and are immediately available.

According to another embodiment of the present invention, a bank receives authorization from a lender to credit loan proceeds from the lender to an approved borrower on an existing pre-paid card issued by or associated with the pre-paid card processor. Then the bank credits the loan proceeds relatively instantaneously to the pre-paid card processor for the existing pre-paid card so that the loan proceeds are released to the approved borrower and are immediately available.

Other embodiments of the present invention include determining whether the borrower has an existing pre-paid card capable of accepting the loan proceeds. As part of the loan approval process, for example, a borrower can be asked to provide existing pre-paid information to the lender. The lender can ask the bank to verify that an existing pre-paid card is capable of accepting the loan proceeds. In addition, the lender can ask the bank to suggest an existing pre-paid card associated with the borrower to accept the loan proceeds. Alternately, the bank can determine that a new pre-paid card is necessary.

To borrowers, benefits of the embodiments of the present invention include convenience of time and place. The convenience of time includes being able to access loan proceeds immediately after the activation of a pre-paid card, without waiting two to six weeks for the arrival of a customized credit card and without the delays, hassles, and cost associated with handling a negotiable instrument, such as, for example, a check. In addition, if the borrower already has a pre-paid card from the pre-paid card processor, the convenience of time includes having access to loan proceeds through the pre-paid card relatively immediately. Also, the embodiments of the present invention, for example, can be implemented around the clock, 24 hours a day, on weekends and holidays, outside of traditional banking hours and even outside of typical extended retailer hours of a payday advance lender. The convenience of place includes being able to access loan proceeds at, for example, thousands of locations nationwide where pre-paid cards are sold. In addition, if the borrower already has a pre-paid card from the pre-paid card processor, the convenience of place includes the borrower being able to apply for a loan and access the loan proceeds over the phone or Internet, without needing to go anywhere.

To lenders, benefits of the embodiments of the present invention include the ability to distribute loan proceeds quickly and electronically, without the need for an expensive bricks-and-mortar presence. The features of the embodiments of the present invention enable lenders to attract new customers and expand into new markets, both geographically and demographically. For example, under embodiments of the present invention, a traditional regional lender can now operate nationwide. For example, under embodiments of the present invention, traditional lenders can now compete directly with payday lenders in terms of convenience—without having to expand their retail presence.

Embodiments of the present invention include a system of loading loan proceeds to a pre-paid card. The system includes a bank computer communicating through an electronic communications network with a lender computer. The lender computer is positioned to approve a loan request from a borrower and authorize the bank computer to credit proceeds of a loan on a pre-paid card. The system also includes a pre-paid card processor computer in communication with the bank computer through an electronic communications network. The pre-paid card processor computer is positioned to notify the bank computer of an activation of a pre-paid card. The system further includes a computer program product associated with the bank computer, stored on a tangible computer memory media, and operable on a computer, the computer program product comprising a set of instructions that, when executed by the computer, cause the computer to perform various operations. The operations can include receiving authorization by the bank computer from the lender computer to credit loan proceeds from the lender to the approved borrower on a pre-paid card issued by or associated with the pre-paid card processor so that release of the loan proceeds is pending an activation of a pre-paid card. The operations can also include receiving notice of an activation of a pre-paid card issued by or associated with the pre-paid card processor responsive to an activation request on behalf of the approved borrower and crediting the pending loan proceeds by the bank computer to the pre-paid card processor for the activated pre-paid card so that the loan proceeds are released to the approved borrower and are immediately available.

Embodiments of the present invention include a computer program product, stored on a tangible computer memory media, operable on a computer, the computer program product comprising a set of instructions that, when executed by the computer, cause the computer to perform various operations. The operations include receiving authorization by a bank from a lender to credit loan proceeds from the lender to an approved borrower on a pre-paid card issued by or associated with a pre-paid card processor so that release of the loan proceeds is pending an activation of a pre-paid card. The operations further include receiving notice of an activation of a pre-paid card issued by or associated with the pre-paid card processor responsive to an activation request on behalf of the approved borrower. The operations also include crediting the pending loan proceeds by the bank to the pre-paid card processor for the activated pre-paid card so that the loan proceeds are released to the approved borrower and are immediately available.

In addition, embodiments, of the present invention include systems, program products, and associated methods of loading loan proceeds to a pre-paid card as will be understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 14 is a table illustrating method availability by pre-paid card processor according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 15:
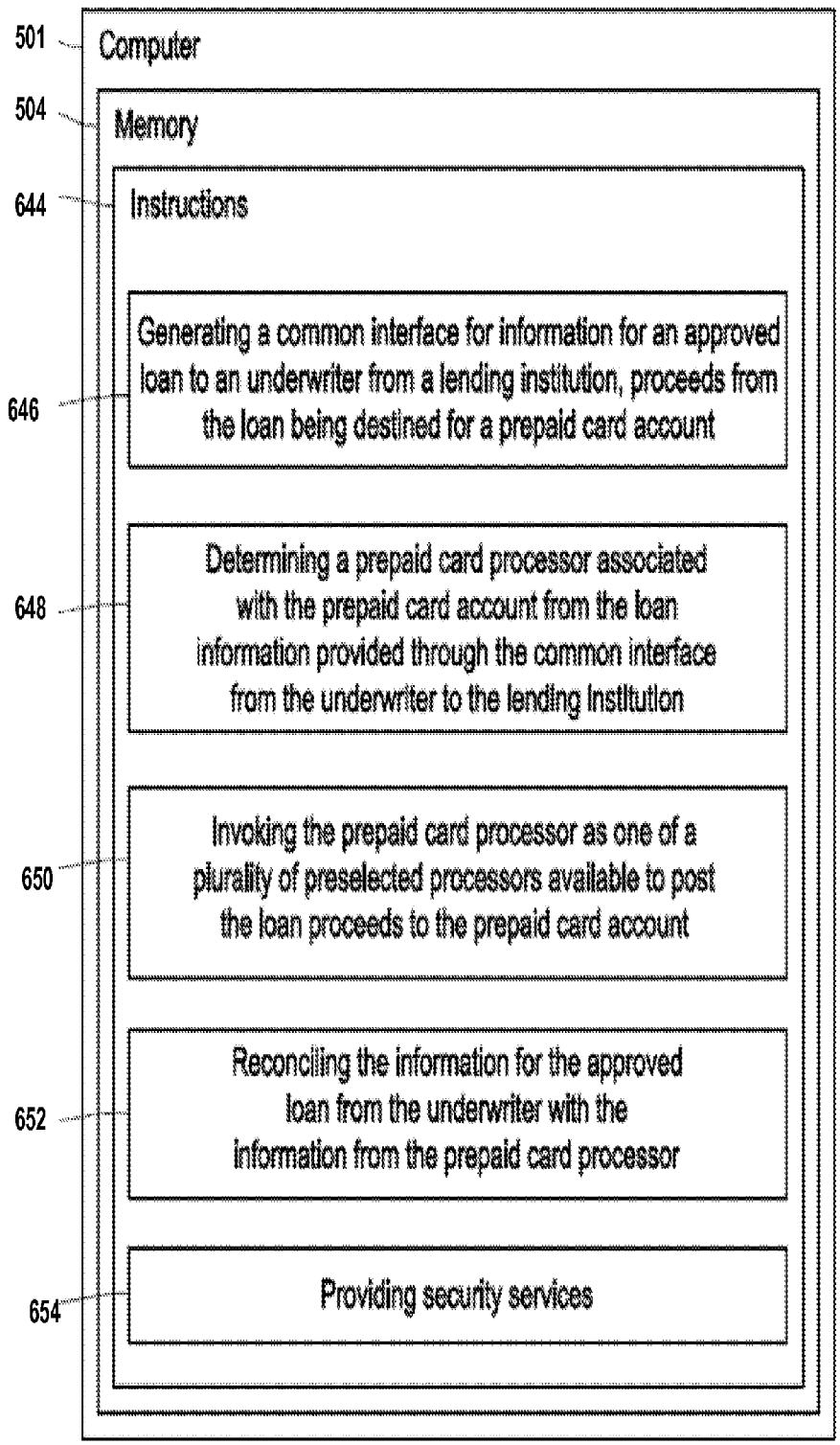
FIG. 15 is a schematic block diagram of a computer having a computer readable medium according to another embodiment of the present invention.

Applicant has identified that the different interfaces of the existing prepaid card processors are a source of problems with advancing loan proceeds on a scalable volume of prepaid cards. For example, as illustrated in FIG. 15, these different interfaces can add complexity and can needlessly limit the ability of a lender to make loans widely available to customers with prepaid cards. Note that no two prepaid card processors provide the same method availability, and that no prepaid card processor supports every method. An interface is defined as a boundary across which two systems interact or communicate, including the software codes and data formats that applications use to communicate, as understood by those skilled in the art. From a customer's point of view, it is desirable to be able to apply for a loan and have access to the proceeds without having to collect the loan proceeds in person. Likewise, lenders would like to be able to offer loans and advance the proceeds conveniently, without concerning retail space for the delivery of the proceeds. Also from a customer's point of view, it is desirable for multiple lenders to be able to compete for the customer's business. From a lender's perspective, it is desirable to be able to make a loan to anyone with a loadable prepaid card, without regard to the specific prepaid card processor associated with the customer's prepaid card. Moreover, it is desirable from a lender's perspective to post loan proceeds through multiple prepaid card processors, yet mask the complexity of interacting with various interfaces by utilizing a single, common interface. In addition to broadening the market of lenders to prepaid card accounts, the results of a common interface are reduced error rates and training costs. In view of the foregoing, Applicant provides computer-implemented methods to advance loan proceeds on prepaid cards, and associated systems and computer program products.

Embodiments of the present invention provide various systems, program products, and methods, e.g., computerized methods, of loading a loan on a pre-paid card. According to an embodiment of the present invention, a bank, i.e., a bank computer, receives authorization from a lender, i.e., a lender computer, to credit loan proceeds from the lender to an approved borrower on a pre-paid card issued by or associated with a pre-paid card processor so that release of the loan proceeds is pending an activation of a pre-paid card. Next, the bank computer receives notice of an activation of a pre-paid card issued by or associated with the pre-paid card processor responsive to an activation request on behalf of the approved borrower. Then the bank computer credits the pending loan proceeds to the pre-paid card processor, i.e., a pre-paid processor computer, for the activated pre-paid card so that the loan proceeds are released to the approved borrower and are immediately available to thereby convert the pre-paid card into a loan delivery apparatus. Advantageously, the loan request and authorization process can occur over the Internet or through a telephone conversation, and the pre-paid card can be purchased at, for example, numerous retail outlets. An activation request for the pre-paid card can include, for example, the retailer or the borrower as understood by those skilled in the art.

According to another embodiment of the present invention, a bank computer receives authorization from a lender computer to credit loan proceeds from the lender to an approved borrower on an existing pre-paid card issued by or associated with the pre-paid card processor. Then the bank computer credits the loan proceeds relatively instantaneously to the pre-paid card processor computer for the existing pre-paid card so that the loan proceeds are released to the approved borrower and are immediately available. Advantageously, the loan request and authorization process can occur over the Internet or through a telephone conversation, resulting in loan proceeds being immediately available without delays or the borrower having to travel to a retail lender.

Embodiments of pre-paid card processors include, for example, entities that manage pre-paid card accounts and related transactions, including on behalf of banks and other financial institutions. Embodiments of pre-paid card processors can provide, for example, services for the development, processing and administration of stored value programs, including account origination and management; authorization and settlement processing; and fraud, risk and compliance management. Embodiments of pre-paid card processors can provide, for example, access to accounts and funds transfer through point-of-sale systems, automated teller machines (ATMs), the Internet, Automated Clearing House (ACH) debit, and others as understood by those skilled in the art. Embodiments of pre-paid card processors can operate, for example, data centers, computers, servers, software, databases, and related communication infrastructure. As understood by those skilled in the art, examples of embodiments of pre-paid card processors can include, but are not limited to, FDR, FSV, Galileo, Symmetrex, and TSYS prepaid card processors, for example. First Data Corporation, formerly First Data Resources, (FDR) is a transaction processing company, including pre-paid cards, and is headquartered in Greenwood Village, Colo., as understood by those skilled in the art. FSV Payment Systems, Inc. (FSV) provides pre-paid technology and stored value processing and is headquartered in Houston, Tex., as understood by those skilled in the art. Galileo Processing, Inc. (Galileo) is a privately held, financial payment processing company based out of Salt Lake City, Utah, as understood by those skilled in the art. Symmetrex, Inc. (Symmetrex) is a transaction processing company and a large pre-paid card processor in the United States, located in Maitland, Fla., as understood by those skilled in the art. With headquarters located in Columbus, Ga., Total System Services, Inc. (TSYS) provides electronic payment services to financial institutions and companies, including consumer-finance, credit, debit, healthcare, loyalty, prepaid, chip and mobile payments, as understood by those skilled in the art.

Figure 1:
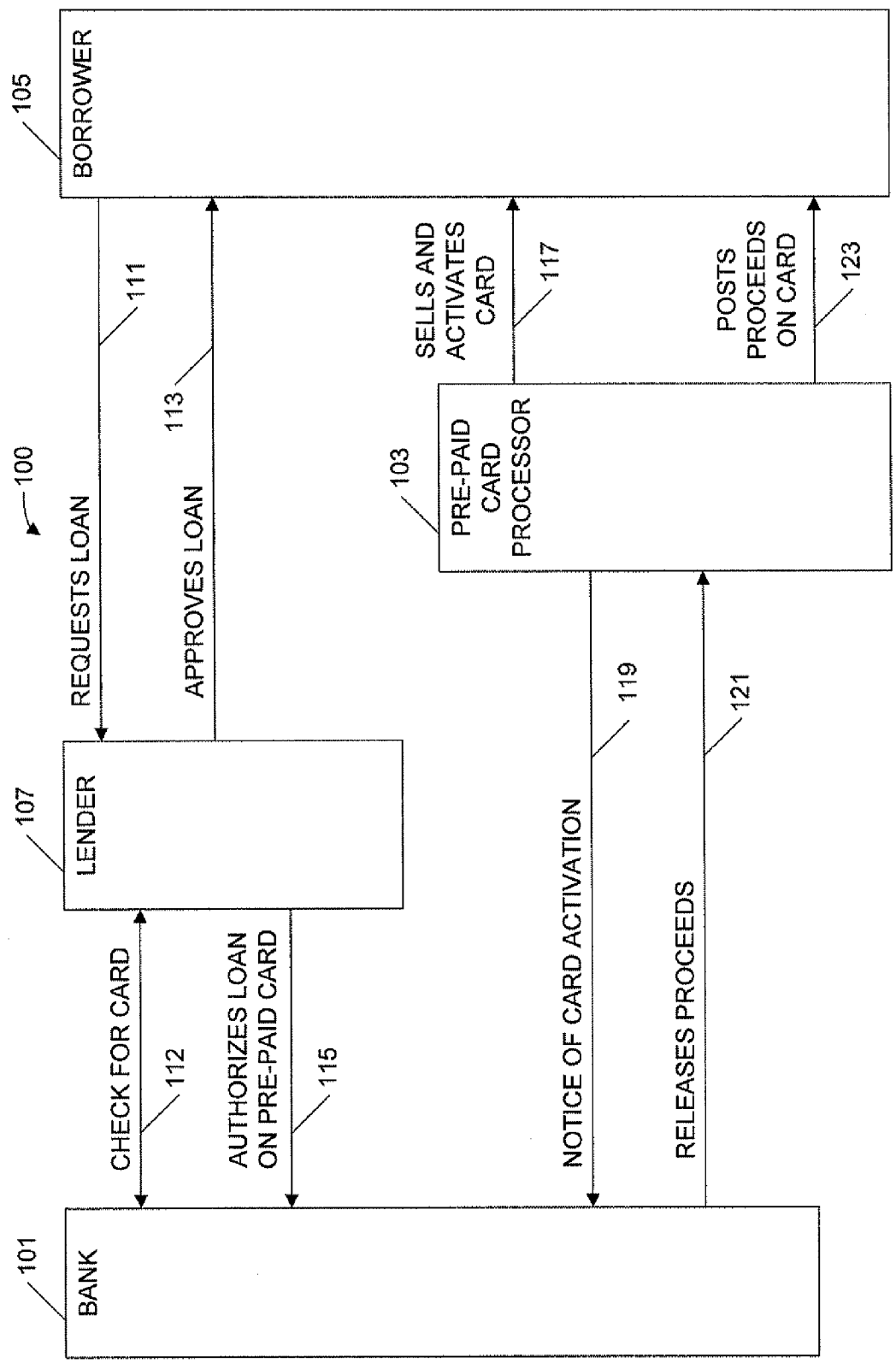
FIG. 1 is a schematic diagram of loading loan proceeds on a pre-paid card according to an embodiment of the present invention.
Figure 6:
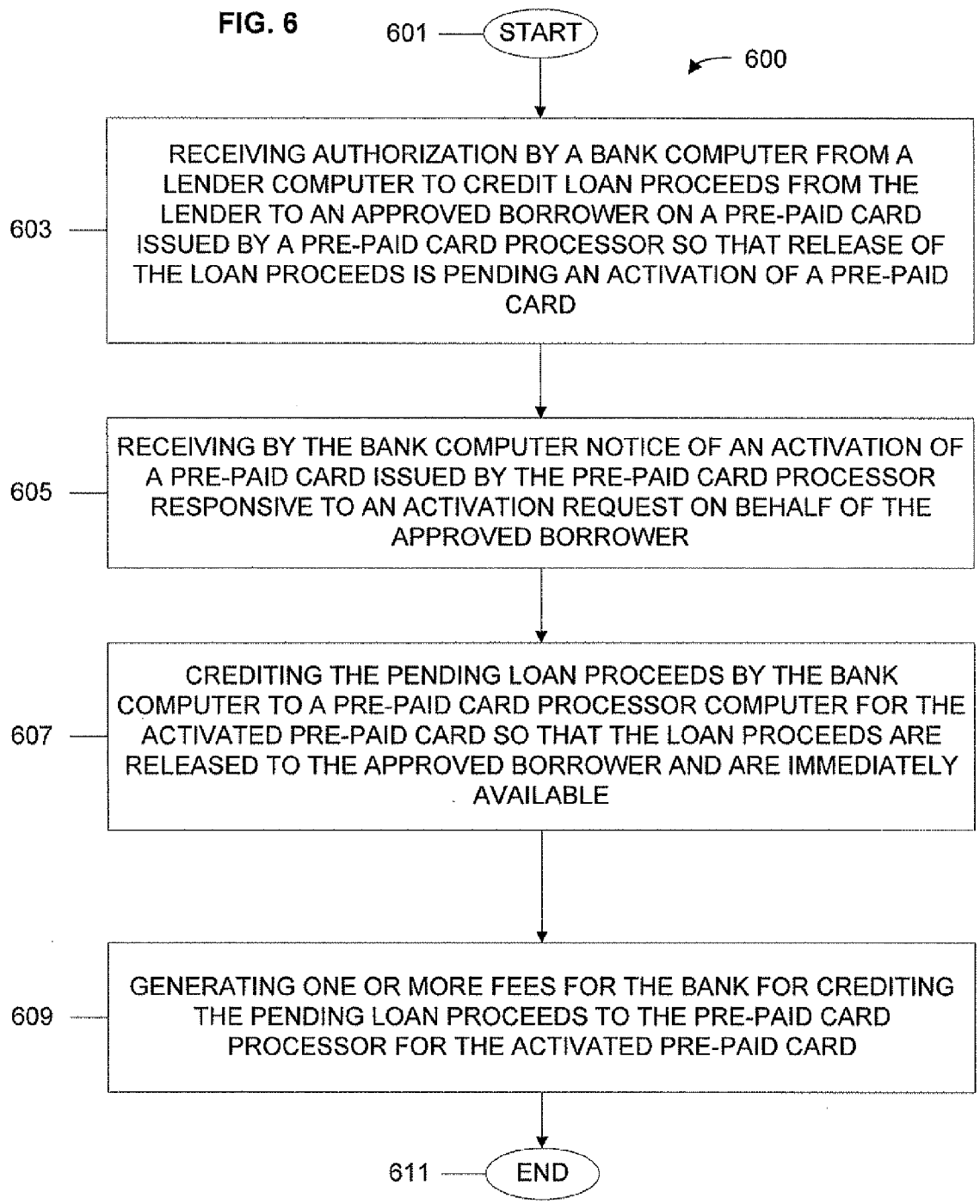
FIG. 6 is a flow diagram of a method of loading loan proceeds on a pre-paid card according to an embodiment of the present invention.

As illustrated in FIGS. 1 and 6, embodiments of the present invention provide, for example, for a method, e.g., a computer-implemented method, 100, 600 of loading loan proceeds to a pre-paid card. The computer-implemented method includes a borrower 105 requesting a loan 111 from a lender 107 and the lender 107 approving the loan 113 to the borrower 105. As part of the loan approval process, the lender 107 can communicate with the bank 101 to check for a pre-paid card 112 for the borrower to either suggest or verify an existing pre-paid card for the borrower 105 or determine that a new pre-paid card is necessary. Next, the computer-implemented method 100, 600 includes the bank receiving authorization in a first computer process from the lender to credit loan proceeds from the lender 107 to the approved borrower 105 on a pre-paid card issued by or associated with the pre-paid card processor 103 so that release of the loan proceeds is pending an activation of a pre-paid card 115, 603. The computer-implemented method can also include the borrower 105 purchasing a pre-paid card from a retailer. The method also includes the borrower 105 (or the retailer or other entity on behalf on the borrower 105) requesting activation of the pre-paid card 117 by the pre-paid card processor 103. The computer-implemented method 100, 600 includes the bank 101 receiving in a second computer process notice of an activation of a pre-paid card issued by or associated with the pre-paid card processor responsive to an activation request on behalf of the approved borrower 119, 605. The computer-implemented method 100, 600 includes the bank crediting the pending loan proceeds in a third computer process to the pre-paid card processor for the activated pre-paid card responsive to the received authorization from the first computer process and the received notice of activation from the second computer process so the loan proceeds are released to the approved borrower and are immediately available 121, 607 to thereby convert the pre-paid card into a loan delivery apparatus. The method includes the pre-paid card processor 103 posting the loan proceeds to the pre-paid card 123 as understood by those skilled in the art. The method can also include generating one or more fees for the bank for crediting the pending loan proceeds to the pre-paid card processor for the activated pre-paid card 609. The generated fees are to be paid by the lender 107, the approved borrower 105, or both.

According to other embodiments of the present invention, loan proceeds are available to the approved borrower 105 through the pre-paid card after a delay of one-half of one second to one minute after receiving notice of the activation of the pre-paid card. That is, embodiments of the present invention impose a delay having a range of between one-half of one second and one minute. This delay can include the network delays and processing delays on and between the various computers.

Figure 11:
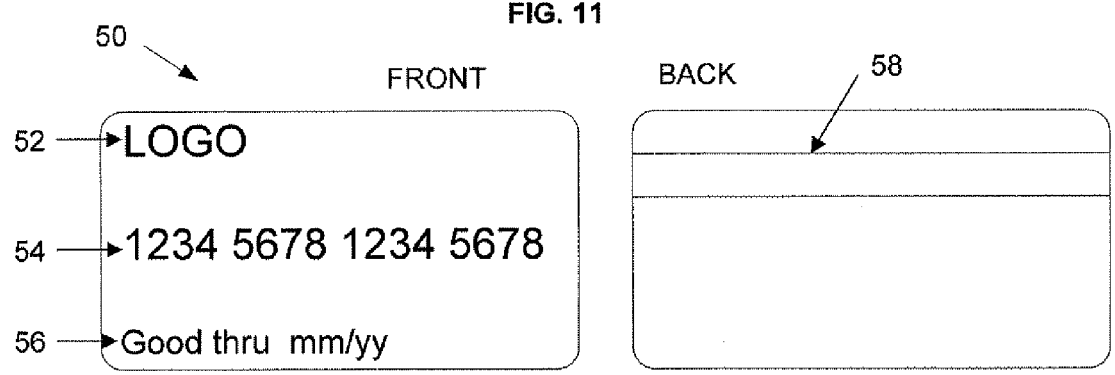
FIG. 11 is respective front and back plan views of a prepaid card according to an embodiment of the present invention according to an embodiment of the present invention.

According to other embodiments of the present invention, the notice of the activation of the pre-paid card issued by or associated with the pre-paid card processor includes information identifying the approved borrower 105 and the pre-paid card 50 (see, e.g., FIG. 11). Pre-paid cards 50 typically include a unique 16-digit account number 54 as understood by those skilled in the art. The notice of the activation of the pre-paid card from the pre-paid card processor provides the bank with information identifying the pre-paid card, e.g., the 16-digit card number or account number, and information identifying the approved borrower, e.g., the name of the borrower, social security number, address, or other information as understood by those skilled in the art so that the bank can match the pending loan proceeds to the newly activated pre-paid card. In addition, the notice of the activation of the pre-paid card can include a flag, or other designation as understood by those skilled in the art, that the cardholder requested the activation of the pre-paid card in order to access pending loan proceeds.

Figure 2:
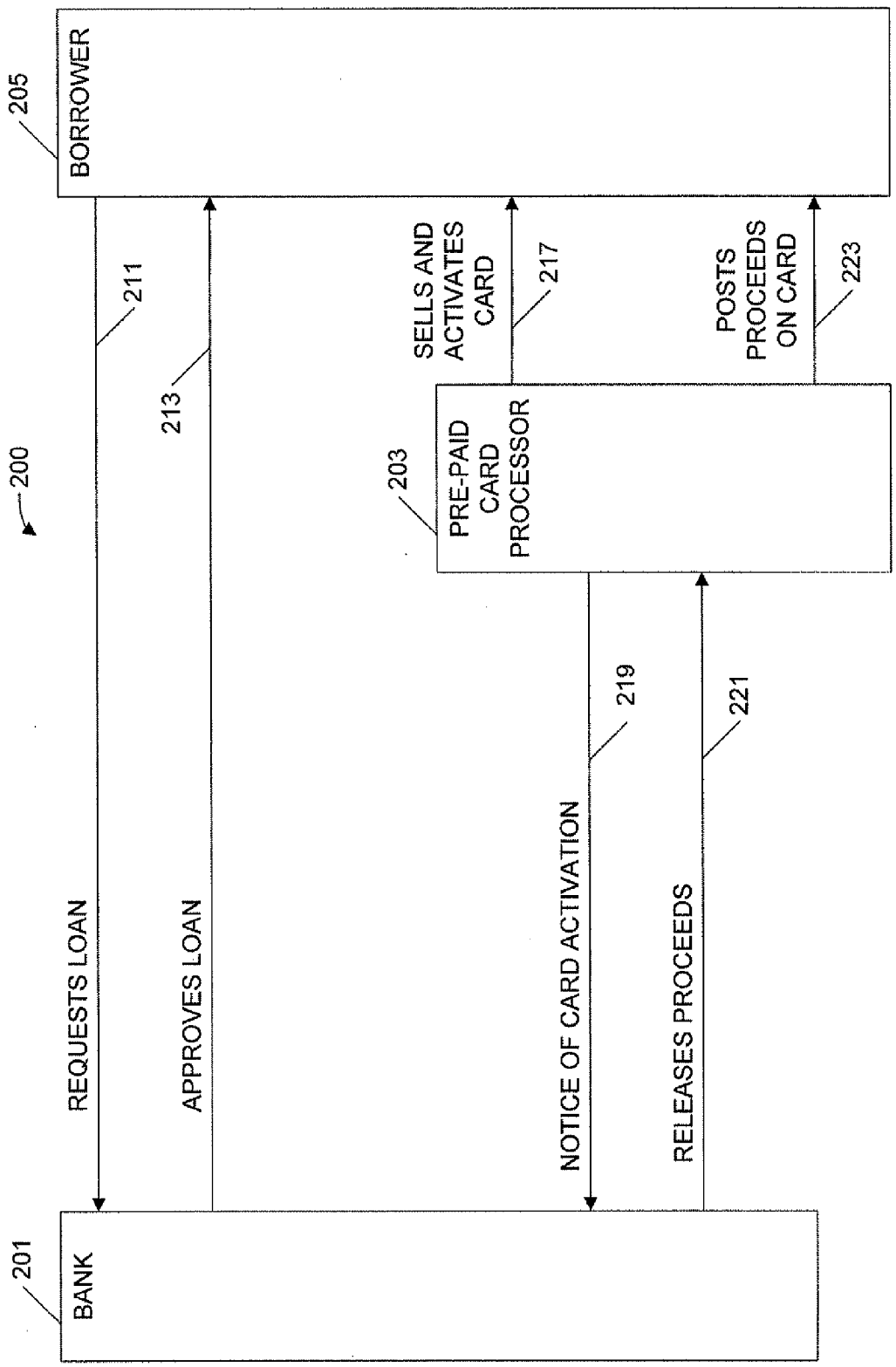
FIG. 2 is a schematic diagram of loading loan proceeds on a pre-paid card according to an embodiment of the present invention.

As illustrated in FIG. 2, the lender and the bank 201 can be the same financial institution or affiliated financial institutions. That is, rather than acting as an intermediary between a lender and the pre-paid card processor, the bank 201 can approve loans 213, authorize the credit of loan proceeds to an approved borrower on a pre-paid card, receive notice of an activation of a pre-paid card 219, and credit the pending loan proceeds to the pre-paid card processor for the activated pre-paid card so that the loan proceeds are released to the approved borrower and are immediately available 221. Thus, a bank 201, acting as a lender, can approve a loan and wait for an activation of a pre-paid card to credit the pending loan proceeds, according to embodiments of the present invention. That is, the bank computer converts loan request data from the borrower into a value associated with the pre-paid card. In other embodiments, the bank and the pre-paid card processor can be the same financial institution or affiliated financial institutions so that the bank computer is positioned to approve or reject a transaction using the loan proceeds on the pre-paid card as payment as understood by those skilled in the art. That is, the bank computer can convert loan data into transaction data responsive to a card reader device reading data from the prepaid card and modifying the data to include point of sale data.

Figure 3:
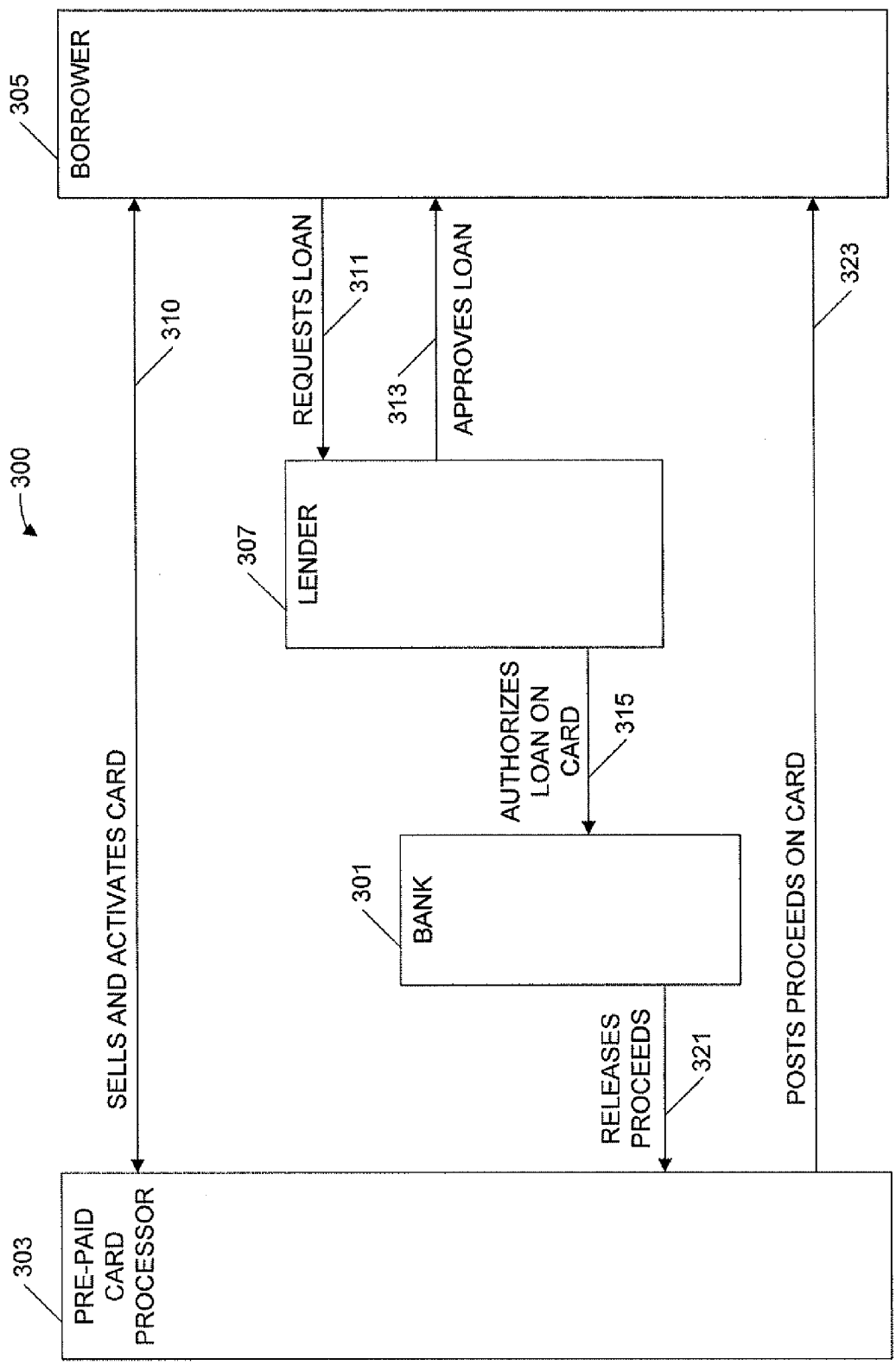
FIG. 3 is a schematic diagram of loading loan proceeds on a pre-paid card according to an embodiment of the present invention.
Figure 7:
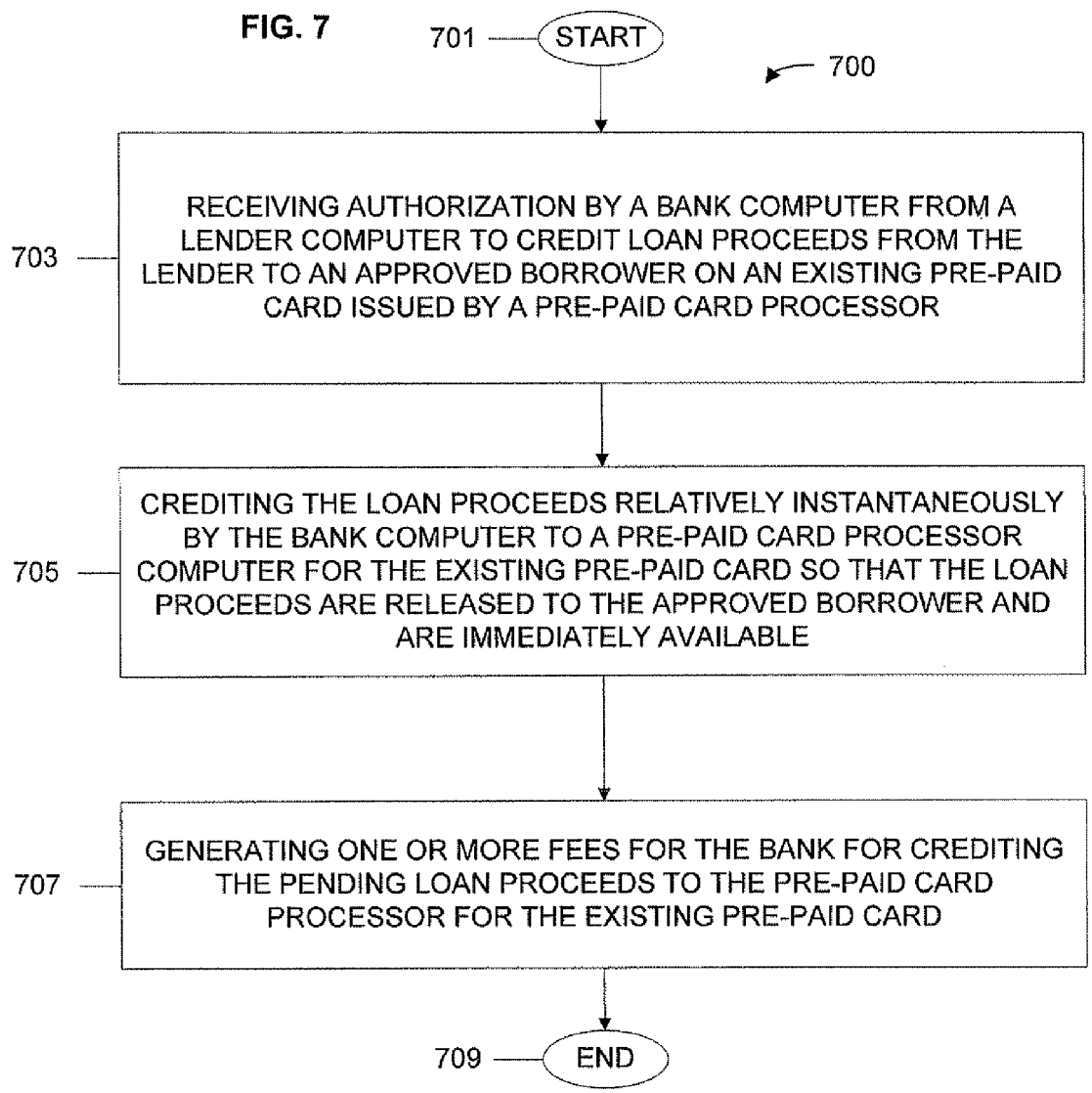
FIG. 7 is a flow diagram of another method of loading loan proceeds on a pre-paid card according to another embodiment of the present invention.

As illustrated in FIGS. 3 and 7, embodiments of the present invention provide, for example, for another computer-implemented method 300, 700 of loading loan proceeds to a pre-paid card. The computer-implemented method 300, 700 includes a pre-paid card processor 303 issuing and activating a pre-paid card 310 to a borrower 305. As understood by those skilled in the art, these steps can occur significantly before, e.g., years before, the remaining steps in the method. The computer-implemented method further includes the borrower 305 requesting a loan 311 from a lender 307 and the lender 307 approving the loan 313 to the borrower 305. Next, the computer-implemented method 300, 700 includes the bank 301 receiving authorization from the lender 307 to credit loan proceeds from the lender 307 to the approved borrower 305 on an existing pre-paid card issued by or associated with the pre-paid card processor 303 so that release of the loan proceeds is pending an activation of a pre-paid card 315, 703. The computer-implemented method 300, 700 then includes the bank 301 crediting the loan proceeds to the pre-paid card processor for the existing pre-paid card so that the loan proceeds are released to the approved borrower and are immediately available 321, 705. The computer-implemented method includes the pre-paid card processor 303 posting the loan proceeds to the pre-paid card 323 as understood by those skilled in the art. The method can also include generating one or more fees for the bank for crediting the pending loan proceeds to the pre-paid card processor for the existing pre-paid card 707. The generated fees are to be paid by the lender 307, the approved borrower 305, or both.

According to other embodiments of the present invention, loan proceeds are available to the approved borrower 305 through the pre-paid card 50 after a delay of one-half of one second to one minute after receiving authorization by the bank from the lender to credit loan proceeds from the lender to the approved borrower on the existing pre-paid card. That is, embodiments of the present invention impose a delay having a range of between one-half of one second and one minute. This delay can include the network delays and processing delays on and between the various computers.

According to other embodiments of the present invention, the authorization received by the bank includes information identifying the existing pre-paid card 50, such as, e.g., the unique 16-digit card number or account number 54. This identifying information allows the bank to match the pending loan proceeds to the existing pre-paid card as understood by those skilled in the art. According to embodiments of the present invention, this pre-paid card information can originate with the borrower or from a suggestion by the bank as part of the loan request process as understood by those skilled in the art.

Figure 4:
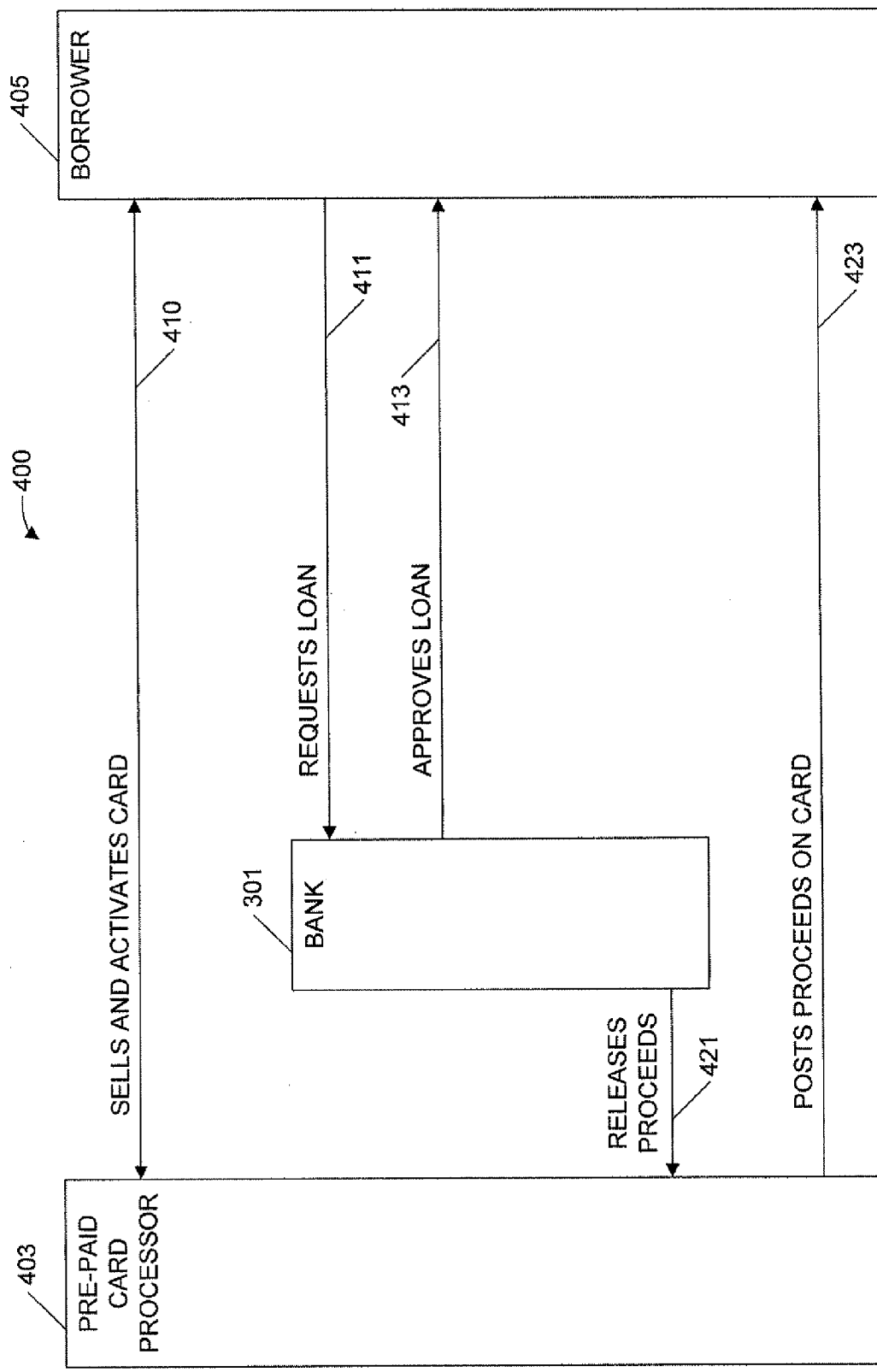
FIG. 4 is a schematic diagram of loading loan proceeds on a pre-paid card according to an embodiment of the present invention.

As illustrated in FIG. 4, the lender and the bank 301 can be the same financial institution or affiliated financial institutions. That is, rather than acting as an intermediary between a lender and the pre-paid card processor 403, the bank 401 can approve loans 413, authorize the credit of loan proceeds to an approved borrower on an existing pre-paid card, and credit the loan proceeds to the pre-paid card processor for the existing pre-paid card so that the loan proceeds are released to the approved borrower and are immediately available 421. Accordingly, the bank computer can converts loan request data from the borrower into a value associated with the pre-paid card. In other embodiments, the bank and the pre-paid card processor can be the same financial institution or affiliated financial institutions so that the bank computer is positioned to approve or reject a transaction using the loan proceeds on the pre-paid card as payment as understood by those skilled in the art. That is, the bank computer can convert loan data into transaction data responsive to a card reader device reading data from the prepaid card and modifying the data to include point of sale data.

Figure 12:
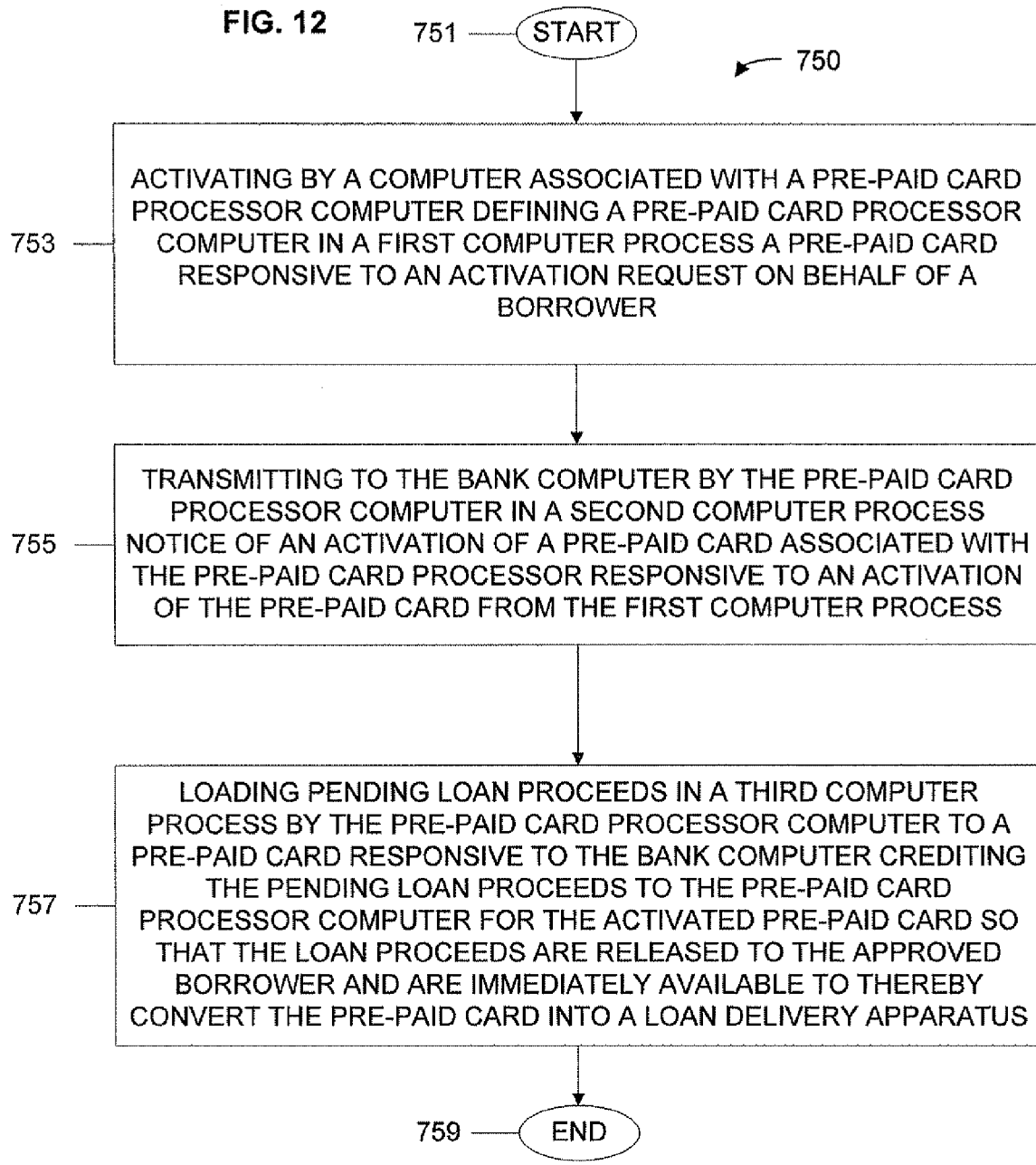
FIG. 12 is a flow diagram of a method of loading loan proceeds on a pre-paid card according to an embodiment of the present invention.

As illustrated in FIG. 12, embodiments of the present invention include, for example, a computer-implemented method of loading loan proceeds to a pre-paid card. The computer-implemented method can include activating by a computer associated with a pre-paid card processor computer defining a pre-paid card processor computer in a first computer process a pre-paid card responsive to an activation request on behalf of a borrower 753. The computer-implemented method can include transmitting to a bank computer by the pre-paid card processor computer in a second computer process notice of an activation of a pre-paid card associated with the pre-paid card processor responsive to an activation of the pre-paid card from the first computer process 755. The computer-implemented method can include loading pending loan proceeds in a third computer process by the pre-paid card processor computer to a pre-paid card responsive to the bank computer crediting the pending loan proceeds to the pre-paid card processor computer for the activated pre-paid card so that the loan proceeds are released to the approved borrower and are immediately available to thereby convert the pre-paid card into a loan delivery apparatus 757. The operation of loading pending loan proceeds by the pre-paid card processor computer to a pre-paid card can also include changing a physical structure of the pre-paid card, e.g., a magnetic stripe 58, to reflect a presence of funds sufficient up to a specified amount for purchase of goods or services.

To borrowers, benefits of the embodiments of the present invention include convenience of time and place. The convenience of time includes being able to access loan proceeds immediately after the activation of a pre-paid card, without waiting two to six weeks for the arrival of a customized credit card and without the delays and hassles associated with handling a negotiable instrument, such as, for example, a check. In addition, if the borrower already has a pre-paid card from the pre-paid card processor, the convenience of time includes having access to loan proceeds through the pre-paid card relatively immediately. Also, the embodiments of the present invention, for example, can be implemented around the clock, 24 hours a day, on weekends and holidays, outside of traditional banking hours and even outside of typical extended retailer hours of a payday advance lender. The convenience of place includes being able to access loan proceeds at thousands of locations nationwide where pre-paid cards are sold. In addition, if the borrower already has a pre-paid card from the pre-paid card processor, the convenience of place includes the borrower being able to apply for a loan and access the loan proceeds over the phone or Internet, without needing to go anywhere.

To lenders, benefits of the embodiments of the present invention include the ability to distribute loan proceeds quickly and electronically, without the need for an expensive bricks and mortar presence. The features of the embodiments of the present invention enable lenders to attract new customers and expand into new markets, both geographically and demographically.

According to other embodiments of the present invention, the approved borrower purchases the pre-paid card issued by or associated with the pre-paid card processor at a retailer. Therefore, thousands of locations, for example, can be available for the borrower to obtain a pre-paid card issued by or associated with the pre-paid card processor as understood by those skilled in the art.

According to other embodiments of the present invention, the approved borrower and the lender have no business relationship prior to the loan transaction including the authorization from the lender to credit loan proceeds to the approved borrower. Therefore, embodiments of the present invention provide for a first-time borrower, or a borrower using a lender for the first time, as understood by those skilled in the art. That is, no pre-existing relationship, prior to the loan, is necessary.

Therefore, embodiments of the present invention feature numerous convenient approaches to request a loan or activate a pre-paid card. According to embodiments of the present invention, for example, receiving authorization by a bank from a lender to credit loan proceeds from the lender to an approved borrower on a pre-paid card issued by or associated with a pre-paid card processor is responsive to a loan request by the borrower using one or more of the following: Internet technology, a touchtone telephone, a secure website, a telephone conversation with an interactive voice response unit (IVRU), a telephone conversation with a customer service representative, and a mobile phone. According to other embodiments of the present invention, for example, the activation of a pre-paid card issued by or associated with the pre-paid card processor responsive to an activation request from the approved borrower includes using one or more of the following: Internet technology, a touchtone telephone, a secure website, a telephone conversation with an interactive voice response unit (IVRU), a telephone conversation with a customer service representative, and a mobile phone.

According to other embodiments of the present invention, the bank and the pre-paid card processor can be the same financial institution or affiliated financial institutions. That is, a bank can issue and manage pre-paid cards. According to other embodiments of the present invention, the bank can be a federally-chartered bank subject to federal banking laws and regulations and not subject to state banking laws and regulations. As understood by those skilled in the art, a federally-chartered financial institution can operate in every state with a consistent implementation nationally rather than a state-by-state approach.

Figure 5:
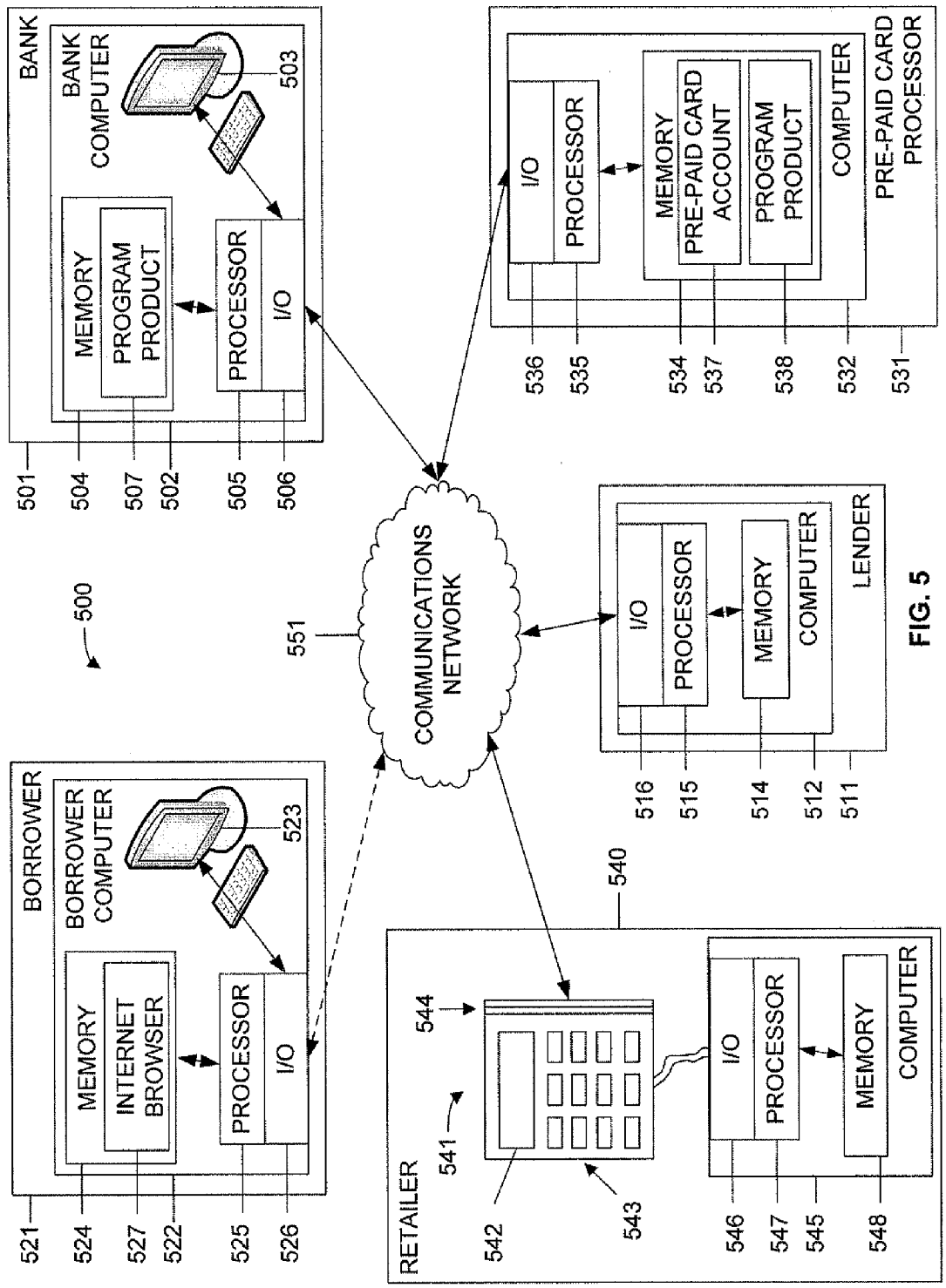
FIG. 5 is a schematic block diagram of a system of loading loan proceeds on a pre-paid card according to an embodiment of the present invention.

As illustrated in FIG. 5, embodiments of the present invention include a system 500 of loading loan proceeds to a pre-paid card. The system 500 can include a computer associated with a bank 501 defining a bank computer 502. The bank computer 502 can include, for example, a display 503; memory 504, such as, computer readable media; one or more processors 505, and input-output I/O devices, e.g., an input/output unit 506. The memory 504 of the bank computer 502 can include program product 507 as described herein. The system 500 can include a computer associated with a lender 511 defining a lender computer 512. The lender computer 512 can include, for example, memory 514, such as, computer readable media; one or more processors 515, and input-output I/O devices, e.g., an input/output unit 516. The memory 516 of the lender computer 502 can include program product to receive loan requests and borrower data; to approve (or reject) loans; and to communicate to the bank computer 502. The system 500 can include a computer associated with a lender 511 defining a lender computer 512. The lender computer 512 can include, for example, memory 514, such as, computer readable media; one or more processors 515, and input-output I/O devices, e.g., an input/output unit 516. The lender computer 512 can be in communication with the bank computer 502 through an electronic communications network 551 and positioned to approve a loan request from a borrower 521 and to authorize the bank computer 502 to credit proceeds of the loan on a pre-paid card 50. The system 500 can include a computer associated with a pre-paid card processor 531 defining a pre-paid card processor computer 532. The pre-paid card processor computer 532 can include, for example, memory 534, such as, computer readable media; one or more processors 535, and input-output I/O devices, e.g., an input/output unit 536. The pre-paid card processor computer 532 can include program product 538 as described herein (see, e.g., FIG. 13) and a pre-paid card account 537 as understood by those skilled in the art. The pre-paid card processor computer 532 can be in communication with the bank computer 502 through an electronic communications network 551 and positioned to notify the bank computer 502 of an activation of a pre-paid card 50.

The system 500 further includes program product 507 associated with the bank computer 502, stored on a tangible computer memory media 504, and operable on a computer, the program product comprising a set of instructions that, when executed by the computer, cause the computer to perform various operations. According to an embodiment of the present invention, the operations include receiving authorization by the bank computer 502 from the lender computer 512 to credit loan proceeds from the lender 511 to the approved borrower 521 on a pre-paid card 50 issued by or associated with the pre-paid card processor 531 so that release of the loan proceeds is pending an activation of a pre-paid card. The operations further include receiving notice of an activation of a pre-paid card issued by or associated with the pre-paid card processor computer 532 responsive to an activation request on behalf of the approved borrower 521. The operations also include crediting the pending loan proceeds by the bank computer 502 to the pre-paid card processor 531 for the activated pre-paid card so the loan proceeds are released to the approved borrower 521 and are immediately available to thereby convert the pre-paid card into a loan delivery apparatus. According to another embodiment of the present invention, the operations include receiving authorization by the bank computer 502 from the lender computer 512 to credit loan proceeds from the lender 511 to the approved borrower 521 on an existing pre-paid card 50 issued by or associated with the pre-paid card processor 531, and crediting the loan proceeds relatively instantaneously by the bank computer 502 to the pre-paid card processor computer 532 for the existing pre-paid card so that the loan proceeds are released to the approved borrower 521 and are immediately available.

The system 500 can also include a computer associated with a borrower 521 defining a borrower computer 522. The borrower computer 522 can include, for example, a display 523; memory 524, such as, computer readable media; one or more processors 525; and input-output I/O devices, e.g., an input/output unit 526. The borrower computer 522 can include an Internet browser 527 as understood by those skilled in the art, a computer application used for accessing sites or information on a network. The borrower computer 522 can be positioned to request a loan from the lender computer 512, communicating through the electronic communications network 551.

Figure 8:
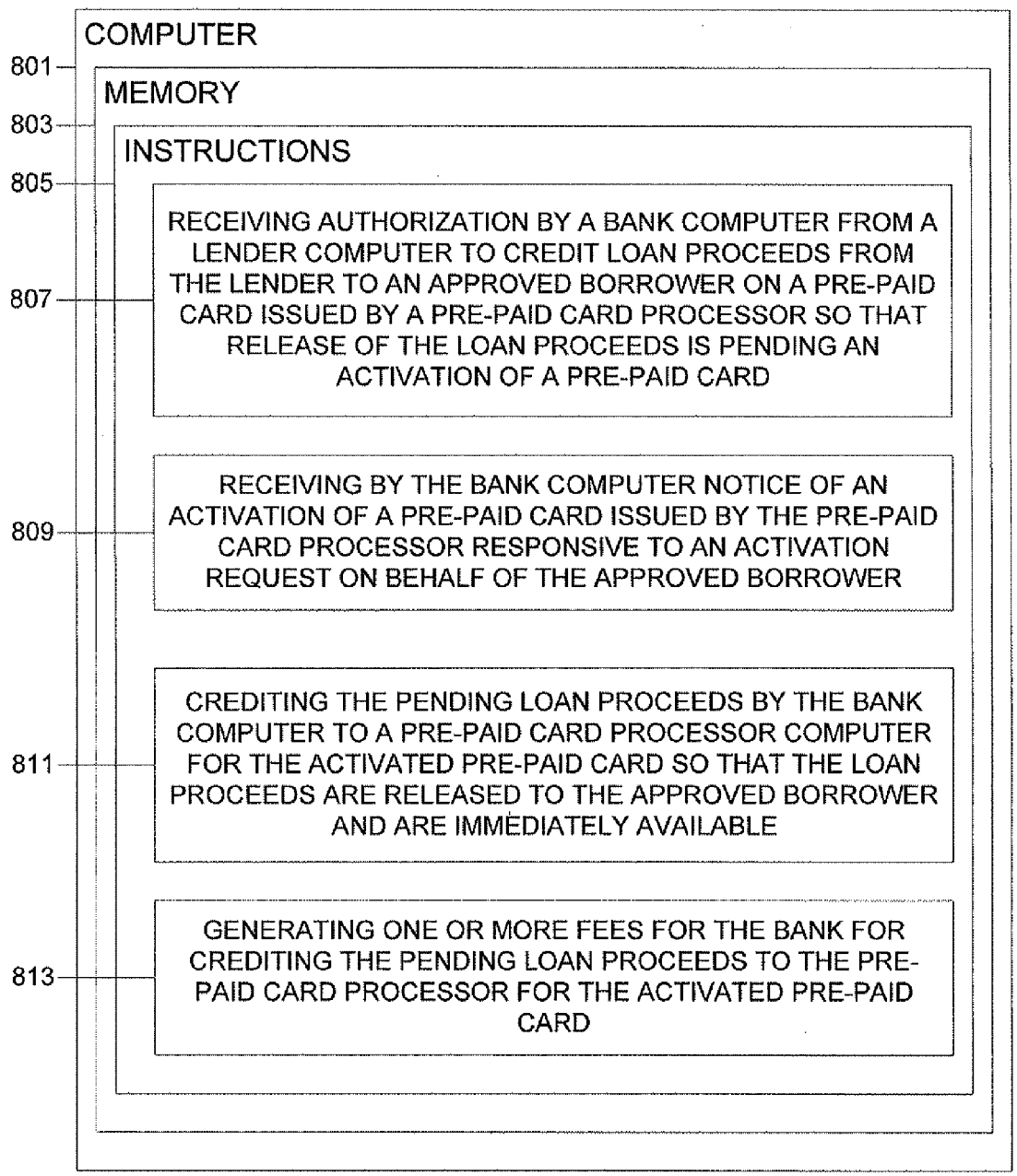
FIG. 8 is a schematic diagram of a computer server having a computer program product stored in memory thereof according to an embodiment of the present invention.

As illustrated in FIG. 8, embodiments of the present invention include, for example, a computer program product 800, stored on a tangible computer memory media 803, operable on a computer 801, the computer program product 800 comprising a set of instructions 805 that, when executed by the computer, cause the computer to perform various operations. The operations can include receiving authorization by a bank computer from a lender computer to credit loan proceeds from the lender to an approved borrower on a pre-paid card issued by or associated with a pre-paid card processor so that release of the loan proceeds is pending an activation of a pre-paid card 807. The operations can further include receiving by the bank computer notice of an activation of a pre-paid card issued by or associated with the pre-paid card processor responsive to an activation request on behalf of the approved borrower 809. The operations can also include crediting the pending loan proceeds by the bank computer to the pre-paid card processor computer for the activated pre-paid card so that the loan proceeds are released to the approved borrower and are immediately available 811 to thereby convert the pre-paid card into a loan delivery apparatus. The operations can also include generating one or more fees for the bank for crediting the pending loan proceeds to the pre-paid card processor for the activated pre-paid card 813.

Figure 9:
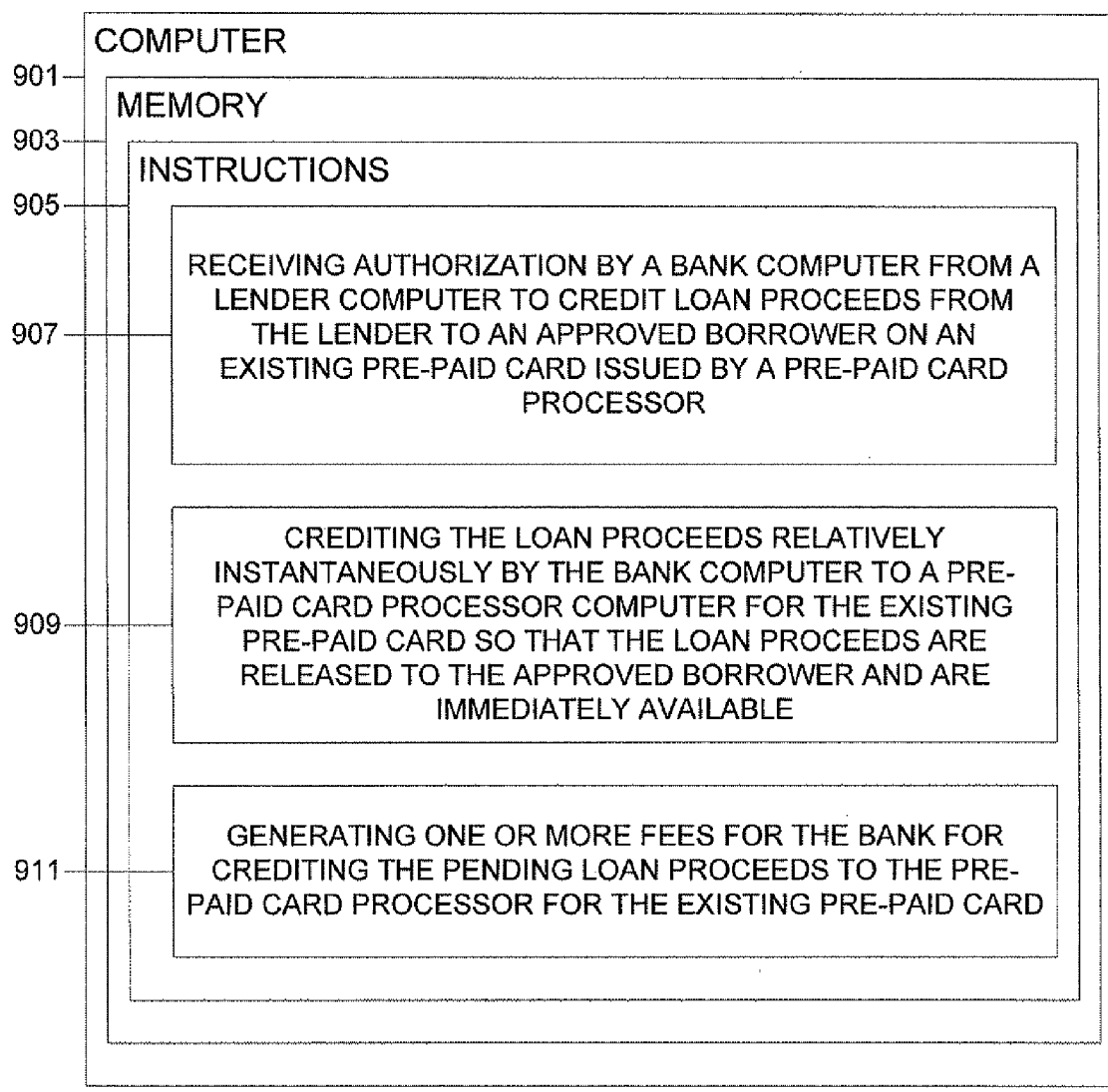
FIG. 9 is a schematic diagram of another computer server having another computer program product stored in memory thereof according to another embodiment of the present invention.

As illustrated in FIG. 9, embodiments of the present invention include, for example, a computer program product 900, stored on a tangible computer memory media 903, operable on a computer 901, the computer program product 900 comprising a set of instructions 905 that, when executed by the computer, cause the computer to perform various operations. The operations can include receiving authorization by a bank computer from a lender computer to credit loan proceeds from the lender to an approved borrower on an existing pre-paid card issued by or associated with a pre-paid card processor 907. The operations can further include crediting the loan proceeds relatively instantaneously by the bank computer to the pre-paid card processor computer for the existing pre-paid card so that the loan proceeds are released to the approved borrower and are immediately available 909. The operations can also include generating one or more fees for the bank for crediting the loan proceeds to the pre-paid card processor for the existing pre-paid card 911.

Figure 10:
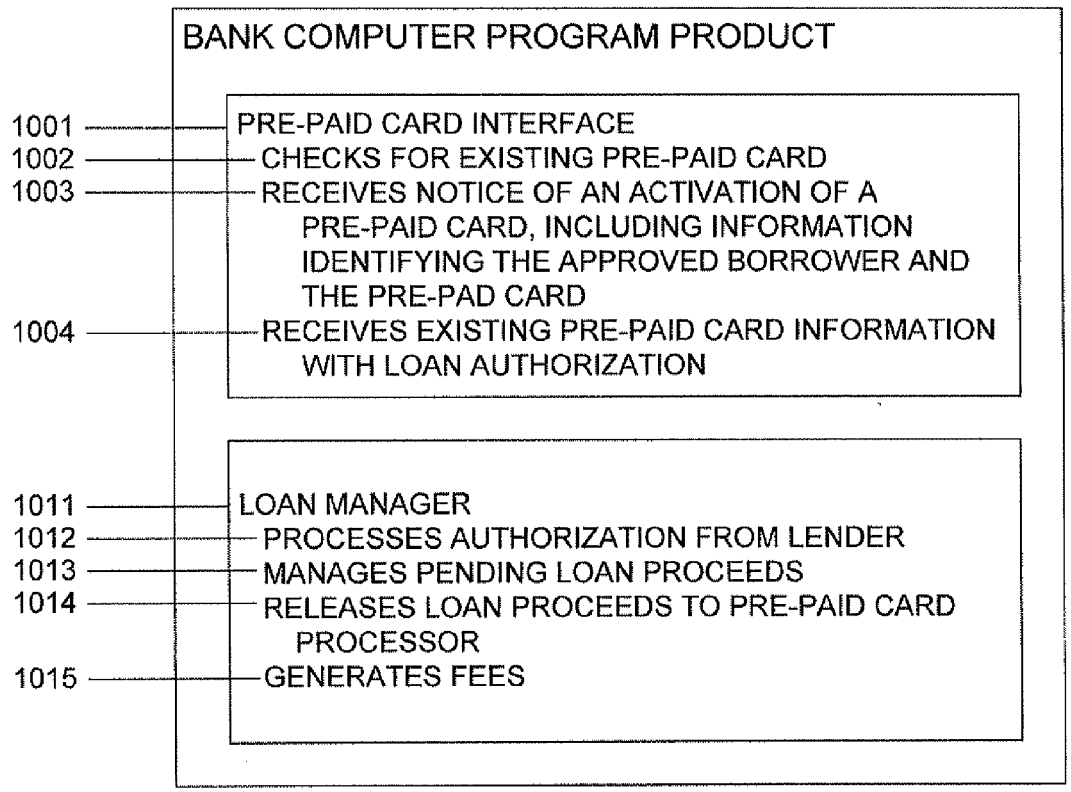
FIG. 10 is a schematic diagram of a computer program product according to an embodiment of the present invention.

Embodiments of the present invention provide, for example, a computer program product 1000 associated with a bank computer implemented in modules or components, as illustrated in FIG. 10. A pre-paid card interface component 1001 of a computer program product 1000 can check for a pre-paid card for the borrower 1001 to either suggest or verify an existing pre-paid card for the borrower or determine that a new pre-paid card is necessary as part of the loan approval process. The pre-paid card interface component 1001 can also receive and process notice of an activation of a pre-paid card, including information identifying the approved borrower and the pre-paid card 1003, and receive existing pre-paid card information 1004 as understood by those skilled in the art. In addition, a loan manager module 1011 can process authorizations from lenders 1012, manage pending loan proceeds 1013, credit loan proceeds to a pre-paid card processor 1014 for an activated or existing pre-paid card, generate fees 1015, and other associated tasks as understood by those skilled in the art. Other architectures and organizations will be understood by those skilled in the art to be included within the embodiments of the present invention. Computer program products can be implemented in a variety of software and programming languages, including without limitation hypertext markup language ("HTML"), Java, C, C++, XML, and others as understood by those skilled in the art.

As illustrated in FIGS. 5 and 11, embodiments of the present invention can include, for example, a card 50, e.g., a prepaid card, and a card reader device 541 associated with a retailer 540. As understood by those skilled in the art, a prepaid card 50 can have indicia 52, e.g., logos, slogans, source identifiers, of a financial institution, i.e., a sponsoring bank and of a prepaid card processor; a serial number 54; and expiration date 56. The structures of various types of specific cards, e.g., magnetic stripe 58, type of material, are well known to those skilled in the art and can be used with embodiments of the present invention. Typically, a pre-paid card 50 is formed from plastic and has a magnetic stripe 58 affixed to the plastic through an application of heat. Those skilled in the art will understand that other embodiments besides a magnetic stripe can include radio frequency identification devices (RFID), smart chips, bar codes, and other similar devices. Embodiments of the present invention can include forming cards or receiving cards already formed. The magnetic stripe card 50 can store information, or data, e.g., account information, by modifying the magnetism of particles on the magnetic stripe 58 on the card. The information can be read by swiping the card through a slot 544 past a reading head of a card reader device 541. The card reader device 541 can include a display 542 and input/output I/O devices 543, e.g., a keypad. The card reader device 541 can be associated with a computer 545, e.g., cash register or point-of-sale, having, for example, memory 548, such as, computer readable media; one or more processors 547; and input-output I/O devices, e.g., an input/output unit 546. Typically, there are two tracks of information on a magnetic card 50 used for financial transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch. Track 2, as typically encoded, was developed by the American Bankers Association (ABA) provides for 37 numeric data characters, including up to 19 digits for a primary account number (including a Bank Identification Number as understood by those skilled in the art), an expiration date, a service code, and discretionary verification data, such as, a Personal Identification Number, or PIN. The information, e.g., data, on the card can be used, for example, to facilitate a transaction. For example, when the card 50 is swiped through a slot 544, the data on the magnetic stripe 58 is read and processed by the card reader 541, converting data stored in the magnetic particles on the card into data associated with readers 541 and a bank computer 502. The card reader 541 and associated computer 545 can then communicate through an electronic communications network 551 to, for example, a pre-paid card processor computer 532. The card reader 541 communicates the account information, e.g., data, as read from the card, as well as other data, such as, an amount of a proposed transaction for approval from the computer 545, e.g., point-of-sale terminal. The other data, for example, can be entered by retailer personnel (e.g., an amount of the transaction), the consumer (e.g., a PIN, or security code), or pre-paid card processor personnel (e.g., a security approval). The pre-paid card processor computer 532 can then utilize the account information and other data to authorize or reject a purchase by, for example, determining whether a proposed purchase by the consumer is less than an amount of funds remaining on the card. Moreover, optional security measures, including, for example, a mismatch between a PIN supplied by the consumer and a PIN stored on the card or in a database, can result in the rejection of a proposed transaction. The pre-paid card processor computer 532 then perform certain functions, including responding to the authorization request so that a point of sale displays an indication of approval or rejection, resulting in a visual depiction to a merchant of the approval or rejection of the proposed transaction. Also, pre-paid card processor computer 532 can, for example, write data to a database to record a purchase or other transaction, to debit available funds from an account associated with the pre-paid card 537, and to credit directly or indirectly a retailer 540 for a purchase. In addition to purchase authorization, embodiments of the present invention also can include customer inquiries into recent transactions or a balance inquiry, i.e., an amount of remaining value associated with the pre-paid card.

Figure 13:
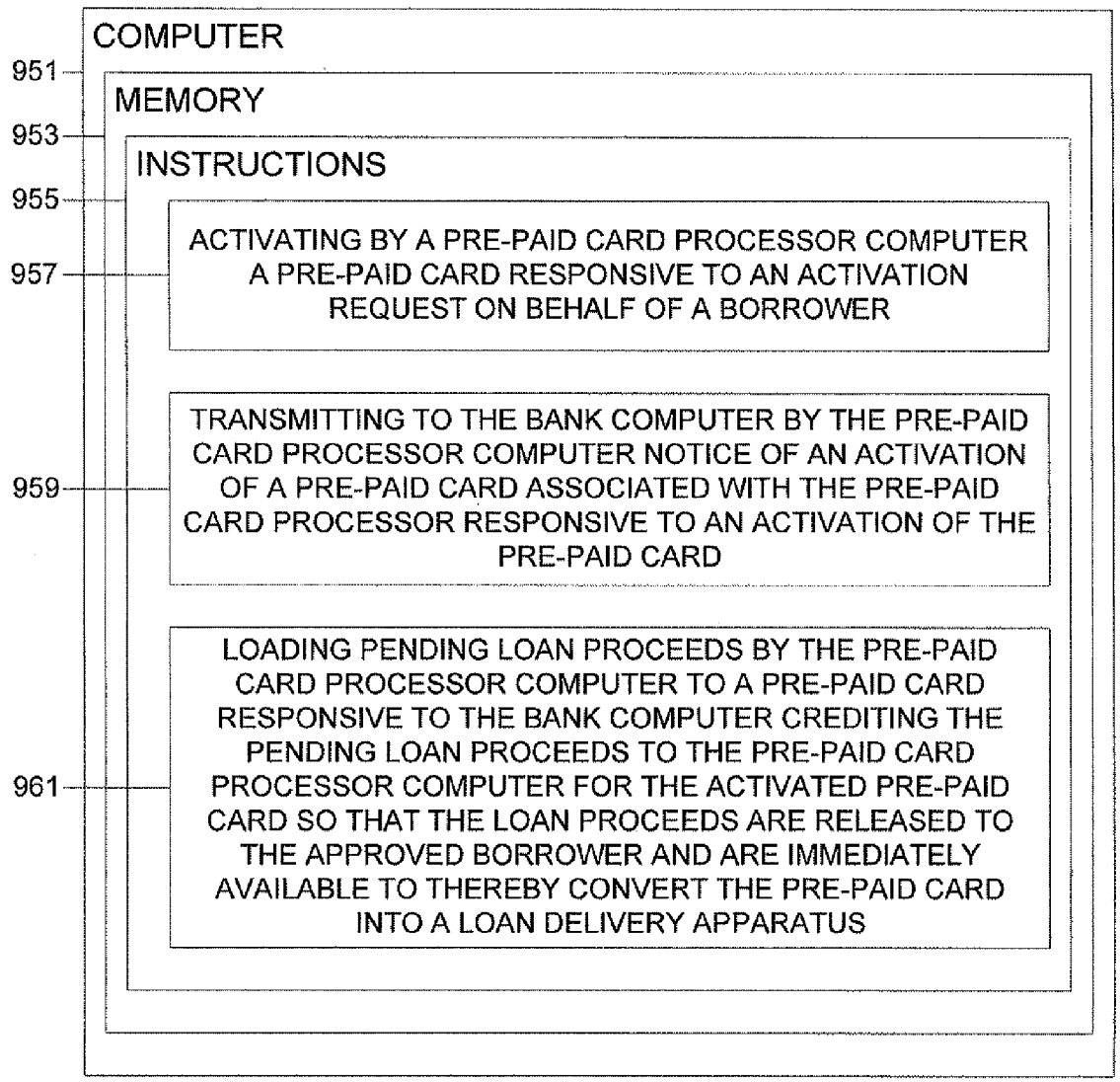
FIG. 13 is a schematic diagram of a computer server having a computer program product stored in memory thereof according to an embodiment of the present invention.

As illustrated in FIGS. 5 and 13, embodiments of the present invention include, for example, a computer system for loading loan proceeds to a pre-paid card. The computer can be associated with a pre-paid card processor 531 and configured as a pre-paid card processor computer 532, 951. The pre-paid card processor computer 532, 951 can be in communication through an electronic communications network 551 with a bank computer 502 positioned to pend and then credit loan proceeds for a pre-paid card 50. The pre-paid card processor computer can include a processor 535 positioned to activate a pre-paid card responsive to a request on behalf of a borrower, to transmit a notice of an activation of the pre-paid card to the bank computer, and to load pending loan proceeds to a pre-paid card. The pre-paid card processor computer can include an input/output unit 536 for transferring data between the processor 535 and the bank computer 502. The pre-paid card processor computer can also include a memory 534 having stored therein program product 538, stored on a tangible computer memory media and operable on the processor. The program product includes a set of instructions 955 that, when executed by the processor, cause the computer to load loan proceeds to a pre-paid card by performing various the operations. The operations can include, for example, activating by the pre-paid card processor computer a pre-paid card responsive to an activation request on behalf of a borrower 957. The operations can include, for example, transmitting to the bank computer by the pre-paid card processor computer notice of an activation of a pre-paid card associated with the pre-paid card processor responsive to an activation of the pre-paid card 959. The operations can include, for example, loading pending loan proceeds by the pre-paid card processor computer to a pre-paid card by changing a physical structure of the pre-paid card to reflect a presence of funds sufficient up to a specified amount for purchase of goods or services responsive to the bank computer crediting the pending loan proceeds to the pre-paid card processor computer for the activated pre-paid card so that the loan proceeds are released to the approved borrower and are immediately available to thereby convert the pre-paid card into a loan delivery apparatus 961. Embodiments further include computer system wherein the activation request on behalf of the borrower includes an indication that the activation request is responsive to a pending loan.

Embodiments further include, for example, a pre-paid card transaction computer to load loan proceeds to a pre-paid card, including loan proceeds pending the activation of the pre-paid card. The pre-paid card transaction computer can be associated with a pre-paid card processor as described herein, as understood by those skilled in the art. The pre-paid card transaction computer can include a processor positioned to activate a plurality of pre-paid cards responsive to a request on behalf of a borrower and to load pending loan proceeds to the pre-paid card. The pre-paid card transaction computer can include an input/output unit for transferring data between the processor and a bank computer. The pre-paid card transaction computer can include a memory having stored therein a computer program product, stored on a tangible computer memory media, operable on the processor, the computer program product comprising a set of instructions that, when executed by the processor, cause the computer to load loan proceeds to the pre-paid card by performing the various operations. The operations can include activating by the processor the pre-paid card responsive to an activation request on behalf of a borrower. The operations can include indicating in memory the pre-paid card to be used with a loan transaction pending the activation of the pre-paid card. The operations can include loading pending loan proceeds by the processor to a pre-paid card responsive to the indication in memory of the pre-paid card to be used with the loan transaction so that the loan proceeds are released to an approved borrower and are immediately available to thereby convert the pre-paid card into a loan delivery apparatus. The operation of loading pending loan proceeds by the processor to a pre-paid card can include, for example, changing a physical structure of the pre-paid card to reflect a presence of funds sufficient up to a specified amount for purchase of goods or services. The operation of loading pending loan proceeds by the processor to a pre-paid card can include, for example, updating a tangible computer memory storing a pre-paid card account associated with the pre-paid card to reflect a presence of funds sufficient up to a specified amount for purchase of goods or services. The operation of indicating in memory the pre-paid card to be used with the loan transaction pending the activation of the pre-paid card can include, for example, transmitting to the bank computer by the pre-paid card transaction computer notice of an activation of a pre-paid card responsive to an activation of the pre-paid card, the notice of the activation of the pre-paid card including information identifying the approved borrower and the pre-paid card. For example, the loan proceeds can be available to the approved borrower through the pre-paid card after a delay of one-half of one second to one minute after the pre-paid card transaction computer activates the pre-paid card, according to embodiments of the present invention. This delay can include the network delays and processing delays on and between the various computers. In addition, the approved borrower can purchase the pre-paid card at a retailer so that the borrower can, after the brief delay, use the pre-paid card at a point-of-sale for a purchase of goods or services. The pending loan proceeds can be, for example, responsive to the bank computer receiving authorization from a lender computer to credit loan proceeds from the lender to an approved borrower on a pre-paid card so that release of the loan proceeds is pending an activation of a pre-paid card.

Embodiments further include, for example, a pre-paid card transaction computer to load loan proceeds to a pre-paid card. The pre-paid card transaction computer can be, for example, in communication with a financial institution computer positioned to pend and then credit loan proceeds for a pre-paid card. The pre-paid card transaction computer can include, for example, a processor positioned to activate a pre-paid card responsive to a request on behalf of a borrower, to transmit a notice of an activation of the pre-paid card to the financial institution computer, and to load pending loan proceeds to the pre-paid card. The pre-paid card transaction computer can include, for example, an input/output unit for transferring data between the processor and the financial institution computer. The pre-paid card transaction computer can include, for example, a memory having stored therein a computer program product, stored on a tangible computer memory media, operable on the processor, the computer program product comprising a set of instructions that, when executed by the processor, cause the computer to load loan proceeds to the pre-paid card by performing various operations. The operations can include, for example, activating by the processor the pre-paid card responsive to an activation request on behalf of a borrower. The operations can include, for example, transmitting to the financial institution computer by the pre-paid card transaction computer notice of an activation of a pre-paid card responsive to an activation of the pre-paid card. The operations can include, for example, loading pending loan proceeds by the processor to the pre-paid card responsive to the financial institution computer crediting the pending loan proceeds to the pre-paid card transaction computer for the activated pre-paid card so that the loan proceeds are released to an approved borrower and are immediately available to thereby convert the pre-paid card into a loan delivery apparatus. The operation of loading pending loan proceeds by the processor to the pre-paid card can include, for example, changing a physical structure of the pre-paid card to reflect a presence of funds sufficient up to a specified amount for purchase of goods or services.

Embodiments further include, for example, a pre-paid card transaction computer or a bank computer to load a plurality of loan proceeds to a plurality of pre-paid cards. The pre-paid card transaction computer can be, for example, in communication with a financial institution computer positioned to credit loan proceeds for a plurality existing pre-paid cards. The pre-paid card transaction computer can include, for example, a processor positioned to load a plurality of loan proceeds to a plurality of existing pre-paid cards and an input/output unit for transferring data between the processor and the financial institution computer. The pre-paid card transaction computer can include, for example, a memory having stored therein a computer program product, stored on a tangible computer memory media, operable on the processor, the computer program product comprising a set of instructions that, when executed by the processor, cause the computer to load a plurality of loan proceeds to a plurality of existing pre-paid cards by performing various operations. The operations can include, for example, loading one of the plurality of loan proceeds by the processor to one of the plurality of existing pre-paid cards responsive to the financial institution computer crediting the one of the plurality of loan proceeds to the pre-paid card transaction computer for the one of the plurality of existing pre-paid cards so that the one of the plurality of loan proceeds is released to an approved borrower and is immediately available to thereby convert the one of the plurality of existing pre-paid cards into a loan delivery apparatus. The operation of loading one of the plurality of loan proceeds by the processor to one of the plurality of existing pre-paid cards can include, for example, changing a physical structure of the one of the plurality of existing pre-paid cards to reflect a presence of funds sufficient up to a specified amount for purchase of goods or services. The one of the plurality of loan proceeds can be, for example, available to the approved borrower through the one of the plurality of existing pre-paid cards after a delay of one-half of one second to one minute after the financial institution computer credits the one of the plurality of loan proceeds to the pre-paid card transaction computer for the one of the plurality of existing pre-paid cards. For example, the approved borrower and the financial institution may have no business relationship prior to the loan transaction wherein the financial institution computer credits the one of the plurality of loan proceeds to the pre-paid card transaction computer for the one of the plurality of existing pre-paid cards.

Embodiments of the claimed invention also include a computer program, associated with a bank computer 501, stored on a tangible computer memory media 504, operable on a computer, and used to advance loan proceeds to a pre-paid card account 537. The computer program product can include various modules, or components, where each module is associated with a computer, stored on a tangible computer memory media and operable on a computer, and includes a set of instructions that, when executed by the computer, cause the computer to perform various operations. For example, the computer program product can include a common interface module associated with the bank computer 501, stored on a tangible computer memory media 504 and operable on a computer; the common interface module can include a set of instructions that, when executed by the computer, cause the computer to perform the operation of receiving data for an approved loan from one or more underwriter computers, where the proceeds from the loan are destined for a pre-paid card account 537. The common interface covers, works with, or feeds various pre-paid card processors, as understood by those skilled in the art. The computer program product can include, for example, a pre-paid card taxonomy module associated with the bank computer 501, stored on a tangible computer memory media 504 and operable on a computer. The pre-paid card taxonomy module can include a set of instructions that, when executed by the computer, cause the computer to classify pre-paid cards according to an associated pre-paid card processor, to maintain and manage a database of pre-paid card files that associates pre-paid cards with pre-paid card processors, and to determine a pre-paid card processor associated with the pre-paid card account from loan data provided through the common interface module from the underwriter computer responsive to a pre-paid card serial number. The computer program product 504 can include, for example, a format translator module associated with the bank computer 501, stored on a tangible computer memory media and operable on a computer. The format translator module can include a set of instructions that, when executed by the computer, cause the computer to invoke the associated pre-paid card processor for a given pre-paid card responsive to the determination of the taxonomy module, to convert the loan data received by the common interface module into a processor-specific instruction format, and to communicate the converted loan data to the pre-paid card processor to post the loan proceeds to the pre-paid card account so that a first data format is converted into a second data format to thereby enable the posting of the loan proceeds to the pre-paid card and so that the loan application is converted into a pre-paid card having an associated value and being capable of purchasing goods. The computer program product can include, for example, a reconciliation module associated with the bank computer 501, stored on a tangible computer memory media and operable on a computer. The reconciliation module can include a set of instructions that, when executed by the computer, cause the computer to receive and compare data for the approved loan, e.g., flat files, or data files that have no structural relationship as understood by those skilled in the art, from the underwriter computer, from the pre-paid card processor, and the format translator module. The reconciliation module can, for example, converts the flat file data into structured database files to thereby reconcile the data and check for errors. In addition, the reconciliation module can, for example, produce error reports responsive to a comparison of the structured database files.

A serial number of a pre-paid card 54 can include, for example, a Bank Identification Number (BIN) as understood by those skilled in the art. Each card number issued within an open payment network, such as, Visa, MasterCard, and others as understood by those skilled in the art, includes a Bank Identification Number. Each Bank Identification Number is assigned to an issuer, i.e., a lending institution, by the open payment network as understood by those skilled in the art. When the Bank Identification Number is configured with the open payment network, the pre-paid card processor, or the destination for authorization and settlement transactions, is designate by the issuer, i.e., the lending institution, as understood by those skilled in the art. According to embodiments of the present invention, the pre-paid card taxonomy module can utilize the Bank Identification Number portion of the serial number of a pre-paid card to determine the pre-paid card processor.

The embodiments of the present invention also include a computer program product, as illustrated in FIG. 15, associated with the bank computer 501, stored on a tangible computer memory media 504, operable on a computer 501, the computer program product comprising a set of instructions that, when executed by the computer, cause the computer to perform various operations. The operations include generating a common interface for information for an approved loan to an underwriter computer from the bank computer when proceeds from the loan are destined for a pre-paid card account (block 646). The operations also include determining a pre-paid card processor associated with the pre-paid card account from the loan information provided through the common interface from the underwriter to the lending institution (block 648). The operations further include invoking the pre-paid card processor as one of a plurality of preselected processors available to post the loan proceeds to the pre-paid card account (block 650). The operations also include reconciling the information for the approved loan from the underwriter computer with the information from the pre-paid card processor (block 652). The operations further include providing security services (block 654), such as permitting only known and verified computer addresses, requiring user name and password, and other such application-level and firewall-level functions, as understood by those skilled in the art.

This application claims priority to and the benefit of: U.S. Provisional Patent Application Ser. No. 61/053,056, by Galit et al., titled "System, Program Product, and Method for Loading a Loan on a Pre-Paid Card" filed May 14, 2008, which is incorporated herein by reference in its entirety. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods to Authorize Draw for Micro-Credit Attached to a Prepaid Card" filed on Apr. 4, 2008; U.S. Provisional Patent Application Ser. No. 61/042,624, by Crowe et al., titled "System, Program Product, and Method to Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid Cards, Associated Systems and Computer Program Products" filed on Feb. 20, 2009; U.S. patent application Ser. No. 12/417,199, by Ahlers et al., titled "System, Program Product, and Associated Methods to Authorize Draw for Micro-Credit Attached to a Prepaid Card" filed on Apr. 2, 2009; U.S. patent application Ser. No. 12/417,211, by Ahlers et al., titled "System, Program Product, and Associated Methods to Authorize Draw for Micro-Credit Attached to a Prepaid Card" filed on Apr. 2, 2009; PCT/US09/39492, by Ahlers et al., titled "System, Program Product, and Associated Methods to Authorize Draw for Micro-Credit Attached to a Prepaid Card" filed on Apr. 3, 2009; PCT/US09/39504, by Ahlers et al., titled "System, Program Product, and Associated Methods to Authorize Draw for Micro-Credit Attached to a Prepaid Card" filed on Apr. 3, 2009; U.S. patent application Ser. No. 12/417,182, by Crowe et al., titled "System, Program Product, and Method to Authorize Draw for Retailer Optimization" filed on Apr. 2, 2009; PCT/US09/39512, by Crowe et al., titled "System, Program Product, and Method to Authorize Draw for Retailer Optimization" filed on Apr. 3, 2009; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; PCT/US08/87689 by Galit et al., titled "Computer-Implemented Methods, Program Product, and System to Enhance Banking Terms Over Time" filed on Dec. 19, 2008; U.S. patent application Ser. No. 12/417,162, by Ahlers et al., titled "System, Program Product, and Method For Debit Card and Checking Account Autodraw" filed on Apr. 3, 2009; PCT/US09/39495, by Ahlers et al., titled "System, Program Product, and Method For Debit Card and Checking Account Autodraw" filed on Apr. 3, 2009; U.S. patent application Ser. No. 12/465,277, by Galit et al., titled "System, Program Product, and Computer-Implemented Method for Loading a Loan on a Pre-Paid Card" filed on May 13, 2009; and U.S. patent application Ser. No. 12/465,306, by Galit et al., titled "System, Program Product, and Computer-Implemented Method for Loading a Loan on an Existing Pre-Paid Card" filed on May 13, 2009, all of which are each incorporated herein by reference in their entireties.

A person having ordinary skill in the art will recognize that various types of memory are media readable by a computer such as described herein, e.g., borrower computer, lender computer, bank computer, pre-paid card processor computer, retailer computer, point-of-sale terminal, payroll processor, or other computers with embodiments of the present invention. Examples of tangible computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMS, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the bank computer to store program products, e.g., including software, thereon. A person having ordinary skill in the art will recognize that various types of computers and computer architectures, including, for example, distributed computing, cloud computing, data centers, mobile and handheld devices, and other systems, are embodiments of the present invention, and these embodiments are intended to be included within the scope of the appended claims. That is, the lender computer, bank computer, pre-paid card processor computer, for example, can be implemented through a distributed computing environment. Likewise, a borrower computer, for example, can be a personal digital assistant (PDA) or a mobile telephone.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

The invention claimed is:

1. A computer associated with a bank defining a bank computer to facilitate activating a plurality of prepaid card accounts and to release a plurality of loan proceeds to the plurality of prepaid card accounts, the bank computer comprising:

a processor positioned to facilitate activating a plurality of prepaid card accounts positioned remote from a bank computer and to facilitate releasing loan proceeds to the plurality of prepaid card accounts, the plurality of prepaid card accounts being associated with a plurality of prepaid card processors each having a different preselected loan processing format;

non-transitory computer-readable medium encoded with computer program and operable on the bank computer, the computer program including:

a prepaid card processor taxonomy module to determine the plurality of prepaid card processors to be associated with loan data received from a second computer associated with a lending institution defining a lending institution computer, the prepaid card taxonomy module comprising a set of instructions that, when executed by the bank computer, cause the bank computer to perform the operations of:

processing a plurality of loan authorizations for a plurality of approved loans each pending activation of one or more of the plurality of prepaid card accounts responsive to receiving loan data from the lending institution computer in a first preselected loan processing format, the lending institution computer configured to approve a plurality of borrowers for the plurality of loans each pending activation of one or more of the plurality of prepaid card accounts, and determining one or more of the plurality of prepaid card processors to be associated with one or more of the plurality of loans responsive to receiving loan data from the lending institution computer, the one or more of the plurality of prepaid card processors each having a preselected processing format different than the first preselected loan processing format and being different from each other, a format translator module to format the loan data to be compatible with each of the one or more of the plurality of prepaid card processors, the format translator module comprising a set of instructions that, when executed by the bank computer, cause the bank computer to perform the operation of:

converting the loan data received in the first preselected loan processing format into a second preselected loan processing format to thereby be compatible with the one or more of the plurality of prepaid card processors responsive to the first preselected loan processing format being determined to be different with the one or more of the plurality of prepaid card processors, a loan manager module to manage the plurality of loans pending activation of one or more of the plurality of prepaid card accounts, the loan manager module comprising a set of instructions that, when executed by the bank computer, cause the bank computer to perform the operations of:

communicating the loan data in a compatible format to the one or more of the plurality of prepaid card processors to thereby request activation of one or more of the plurality of prepaid card accounts at each of the one or more of the plurality of prepaid card processors on behalf of one or more corresponding borrowers, each of the one or more of the plurality of prepaid card accounts configured to have an associated prepaid card, and releasing loan proceeds of one or more of the plurality of loans pending activation of the one or more of the plurality of prepaid card accounts to the one or more of prepaid card processors so that the loan proceeds are available to the corresponding borrower and each of the prepaid cards associated with the one or more of the plurality of prepaid card accounts are converted into a loan delivery apparatus, the releasing being responsive to receiving notification from the one or more of the plurality of prepaid card processors that the one or more of the plurality of prepaid card accounts have been activated.

2. A bank computer as defined in claim 1, wherein the loan proceeds are available for use through each of the prepaid cards associated with the one or more of the plurality of prepaid card accounts after a delay of one-half of one second to one minute after receiving notification from the one or more of the plurality of prepaid card processors that the one or more of the plurality of prepaid card accounts have been activated, and wherein the loan manager module further causes the bank computer to perform the operation of: notifying the lending institution computer of the release of the loan proceeds to the one or more of the plurality of prepaid card processors.

3. A bank computer as defined in claim 1, wherein one or more of the plurality of borrowers purchases the prepaid card at a retailer, and wherein the loan proceeds are immediately available through the prepaid card so that the one or more of the plurality of borrowers can use the prepaid card at a point-of-sale for a purchase of one or more goods or services.

4. A bank computer as defined in claim 1, wherein one or more of the plurality of loan authorizations are responsive to one or more of the plurality of borrowers not having an existing prepaid card account.

5. A bank computer as defined in claim 1, wherein the computer program further includes: a reconciliation module to reconcile data associated with each of the one or more of the plurality of approved loans, the reconciliation module comprising a set of instructions that, when executed by the bank computer, cause the bank computer to perform the operation of: comparing loan data received from the lending institution computer with loan data from the one or more of the plurality of prepaid card processors to thereby check for processing errors to identify potential reconciliation being desired.

6. A bank computer as defined in claim 1, wherein the loan manager module further causes the bank computer to perform the operation of: generating fees for the bank for each of the plurality of loans for releasing the loan proceeds to the one or more of the plurality of prepaid card processors to thereby manage the one or more of the plurality of loans.

7. Non-transitory computer-readable medium encoded with computer program to facilitate activating a plurality of prepaid card accounts and to release a plurality of loan proceeds to the plurality of prepaid card accounts, the computer program operable on a computer associated with a bank defining bank computer and including:

a prepaid card processor taxonomy module to determine a plurality of prepaid card processors to be associated with loan data received from a second computer associated with a lending institution defining a lending institution computer, the prepaid card taxonomy module comprising a set of instructions that, when executed by the bank computer, cause the bank computer to perform the operations of:

processing a plurality of loan authorizations for a plurality of approved loans each pending activation of one or more of a plurality of prepaid card accounts responsive to receiving loan data from the lending institution computer in a first preselected loan processing format, the lending institution computer configured to approve a plurality of borrowers for the plurality of loans each pending activation of one or more of the plurality of prepaid card accounts, and determining one or more of the plurality of prepaid card processors to be associated with one or more of the plurality of loans responsive to receiving loan data from the lending institution computer, the one or more of the plurality of prepaid card processors each having a preselected processing format different than the first preselected processing format and being different from each other, a format translator module to format the loan data to be compatible with each of the one or more of the plurality of prepaid card processors, the format translator module comprising a set of instructions that, when executed by the bank computer, cause the bank computer to perform the operation of:

converting the loan data received in the first preselected loan processing format into a second preselected loan processing format to thereby be compatible with the one or more of the plurality of prepaid card processors responsive to the first preselected loan processing format being determined to be different and incompatible with the one or more of the plurality of prepaid card processors, a loan manager module to manage the plurality of loans pending activation of one or more of the plurality of prepaid card accounts, the loan manager module comprising a set of instructions that, when executed by the bank computer, cause the bank computer to perform the operations of:

communicating the loan data in a compatible format to the one or more of the plurality of prepaid card processors to thereby request activation of one or more of the plurality of prepaid card accounts at each of the one or more of the plurality of prepaid card processors on behalf of one or more corresponding borrowers, each of the one or more of the plurality of prepaid card accounts configured to have an associated prepaid card, and releasing loan proceeds of one or more of the plurality of loans pending activation of the one or more of the plurality of prepaid card accounts to the one or more of prepaid card processors so that the loan proceeds are available to the corresponding borrower and each of the prepaid cards associated with the one or more of the plurality of prepaid card accounts are converted into a loan delivery apparatus, the releasing being responsive to receiving notification from the one or more of the plurality of prepaid card processors that the one or more of the plurality of prepaid card accounts have been activated.

8. Non-transitory computer medium as defined in claim 7, wherein the loan proceeds are available for use through each of the prepaid cards associated with the one or more of the plurality of prepaid card accounts after a delay of one-half of one second to one minute after receiving notification from the one or more of the plurality of prepaid card processors that the one or more of the plurality of prepaid card accounts have been activated, and wherein the loan manager module further causes the bank computer to perform the operation of:

notifying the lending institution computer of the release of the loan proceeds to the one or more of the plurality of prepaid card processors.

9. Non-transitory computer medium as defined in claim 7, wherein one or more of the plurality of borrowers purchases the prepaid card at a retailer, wherein the loan proceeds are immediately available through the prepaid card so that the one or more of the plurality of borrowers can use the prepaid card at a point-of-sale for a purchase of one or more goods or services, and wherein the bank is a federally-chartered bank subject to federal banking laws and regulations and not subject to state banking laws and regulations.

10. Non-transitory computer medium as defined in claim 7, wherein one or more of the plurality of loan authorizations are responsive to one or more of the plurality of borrowers not having an existing prepaid card account.

11. Non-transitory computer medium as defined in claim 7, wherein the computer program further includes: a reconciliation module to reconcile data associated with each of the one or more of the plurality of approved loans, the reconciliation module comprising a set of instructions that, when executed by the bank computer, cause the bank computer to perform the operation of: comparing loan data received from the lending institution computer with loan data from the one or more of the plurality of prepaid card processors to thereby check for processing errors to identify potential reconciliation being desired.

12. Non-transitory computer medium as defined in claim 7, wherein the loan manager module further causes the bank computer to perform the operation of: generating fees for the bank for each of the plurality of loans for releasing the loan proceeds to the one or more of the plurality of prepaid card processors to thereby manage the one or more of the plurality of loans.

13. A computer-implemented method to facilitate activating a plurality of prepaid card accounts and to release a plurality of loan proceeds to the plurality of prepaid card accounts, the computer implemented method comprising the steps of:

processing, by a first computer associated with a bank defining a bank computer, a plurality of loan authorizations for a plurality of approved loans each pending activation of one or more of a plurality of prepaid card accounts responsive to receiving loan data from a second computer associated with a lender defining a lending institution computer in a first preselected loan processing format, the lending institution computer configured to approve a plurality of borrowers for the plurality of loans each pending activation of one or more of the plurality of prepaid card accounts, determining, by the bank computer, one or more of the plurality of prepaid card processors to be associated with one or more of the plurality of loans responsive to receiving loan data from the lending institution computer, the one or more of the plurality of prepaid card processors each having a preselected processing format different than the first preselected loan processing format and different from each other, converting, by the bank computer, the loan data received in the first preselected loan processing format into a second preselected loan processing format to thereby be compatible with the one or more of the plurality of prepaid card processors responsive to the first preselected loan processing format being determined to be different and incompatible with the one or more of the plurality of prepaid card processors, communicating, by the bank computer, the loan data in a compatible format to the one or more of the plurality of prepaid card processors to thereby request activation of one or more of the plurality of prepaid card accounts at each of the one or more of the plurality of prepaid card processors on behalf of one or more corresponding borrowers, each of the one or more of the plurality of prepaid card accounts configured to have an associated prepaid card, and releasing, by the bank computer, loan proceeds of one or more of the plurality of loans pending activation of the one or more of the plurality of prepaid card accounts to the one or more of prepaid card processors so that the loan proceeds are available to the corresponding borrower and each of the prepaid cards associated with the one or more of the plurality of prepaid card accounts are converted into a loan delivery apparatus, the releasing being responsive to receiving notification from the one or more of the plurality of prepaid card processors that the one or more of the plurality of prepaid card accounts have been activated.

14. A computer-implemented method as defined in claim 13, wherein the loan proceeds are available for use through each of the prepaid cards associated with the one or more of the plurality of prepaid card accounts after a delay of one-half of one second to one minute after receiving notification from the one or more of the plurality of prepaid card processors that the one or more of the plurality of prepaid card accounts have been activated, and wherein the computer-implemented method further comprises the step of: notifying, by the bank computer, the lending institution computer of the release of the loan proceeds to the one or more of the plurality of prepaid card processors.

15. A computer-implemented method as defined in claim 13, wherein one or more of the plurality of borrowers purchases the prepaid card at a retailer, wherein the loan proceeds are immediately available through the prepaid card so that the one or more of the plurality of borrowers can use the prepaid card at a point-of-sale for a purchase of one or more goods or services, and wherein the bank is a federally-chartered bank subject to federal banking laws and regulations and not subject to state banking laws and regulations.

16. A computer-implemented method as defined in claim 13, wherein one or more of the plurality of loan authorizations are responsive to one or more of the plurality of borrowers not having an existing prepaid card account.

17. A computer-implemented method as defined in claim 13, wherein the computer-implemented method further comprising the step of: comparing, by the bank computer, loan data received from the lending institution computer with loan data from the one or more of the plurality of prepaid card processors to thereby check for processing errors to identify potential reconciliation being desired.

18. A computer-implemented method as defined in claim 13, wherein the computer-implemented method further comprising the step of: generating fees for the bank for each of the plurality of loans for releasing the loan proceeds to the one or more of the plurality of prepaid card processors to thereby manage the one or more of the plurality of loans.

19. A computer-implemented method as defined in claim 13, wherein the computer-implemented method further comprising the steps of:

receiving, by the bank computer, loan data in flat files from the lending institution computer and from the at least one of the plurality of prepaid card processors;

converting the flat file data into structured database files; and producing error reports responsive to a comparison of the structured database files and the converted loan data.

20. A computer-implemented method as defined in claim 13, wherein the computer-implemented method further comprising the steps of: invoking, by the bank computer, one or more of the plurality of prepaid card processors for one or more of a of a plurality of prepaid card processor-specific instructions prior to converting the loan data; and wherein the loan data in the compatible format being compatible with the one or more of the prepaid card processor-specific instructions.

* * * * *